US010868935B2

(12) United States Patent
Tanizaki

(10) Patent No.: US 10,868,935 B2
(45) Date of Patent: Dec. 15, 2020

(54) INFORMATION PROCESSING DEVICE, INFORMATION PROCESSING METHOD, NON-TRANSITORY RECORDING MEDIUM, AND IMAGE FORMING SYSTEM

(71) Applicant: Tomoya Tanizaki, England (GB)

(72) Inventor: Tomoya Tanizaki, England (GB)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/268,831

(22) Filed: Feb. 6, 2019

(65) Prior Publication Data
US 2019/0306363 A1 Oct. 3, 2019

(30) Foreign Application Priority Data

Mar. 30, 2018 (JP) ................................ 2018-070383
Sep. 26, 2018 (JP) ................................ 2018-180559

(51) Int. Cl.
*H04N 1/00* (2006.01)
*H04N 1/44* (2006.01)

(52) U.S. Cl.
CPC ..... *H04N 1/00973* (2013.01); *H04N 1/00938* (2013.01); *H04N 1/4433* (2013.01); *H04N 2201/0094* (2013.01)

(58) Field of Classification Search
CPC .................. H04N 1/00973; H04N 2201/0094
See application file for complete search history.

(56) References Cited

U.S. PATENT DOCUMENTS

2010/0188695 A1* 7/2010 Okigami ............ H04N 1/00103
358/1.15
2013/0260683 A1* 10/2013 Suzuki .................. G06F 3/1236
455/41.1

(Continued)

FOREIGN PATENT DOCUMENTS

JP 2012-203430 10/2012
JP 2014-042130 3/2014
(Continued)

*Primary Examiner* — Ted W Barnes
(74) *Attorney, Agent, or Firm* — Harness, Dickey and Pierce, P.L.C.

(57) ABSTRACT

An information processing device includes a memory and a processor. The memory stores a first application. The first application is executable on the information processing device that operates in a first operating environment or a second operating environment and is capable of communicating with a second application. The processor obtains communication connection information on a communication connection with a communication target device currently communicated with the information processing device, based on a determination that the information processing device operates in the first operating environment. The communication connection information has been acquired by the second application that controls the communication connection established between the information processing device and the communication target device. The processor further executes the first application to transmit, to the communication target device, a function execution request for executing a function of the communication target device, based on the communication connection information that is obtained.

18 Claims, 14 Drawing Sheets

(56) References Cited

U.S. PATENT DOCUMENTS

| | | | | |
|---|---|---|---|---|
| 2014/0253965 A1* | 9/2014 | Asai | | G06F 3/1255 |
| | | | | 358/1.15 |
| 2014/0268231 A1* | 9/2014 | Ito | | G06F 3/1222 |
| | | | | 358/1.15 |
| 2015/0031404 A1* | 1/2015 | Yada | | H04W 76/36 |
| | | | | 455/508 |
| 2015/0370509 A1* | 12/2015 | Nago | | H04N 1/00188 |
| | | | | 358/1.15 |
| 2016/0044200 A1* | 2/2016 | Araki | | H04N 1/00973 |
| | | | | 358/1.15 |
| 2016/0062553 A1* | 3/2016 | Kang | | H04N 1/00472 |
| | | | | 715/808 |
| 2016/0070513 A1* | 3/2016 | Uchikawa | | G06F 3/1292 |
| | | | | 358/1.15 |
| 2016/0150115 A1 | 5/2016 | Shibukawa et al. | | |
| 2016/0179449 A1* | 6/2016 | Cho | | G06F 3/1275 |
| | | | | 358/1.15 |
| 2016/0182762 A1* | 6/2016 | Eum | | H04L 63/105 |
| | | | | 358/1.14 |
| 2016/0205277 A1* | 7/2016 | Araki | | H04N 1/00411 |
| | | | | 358/1.15 |
| 2017/0013145 A1* | 1/2017 | Hong | | H04N 1/00307 |
| 2017/0024177 A1* | 1/2017 | Yamaguchi | | H04N 1/0014 |
| 2017/0187645 A1* | 6/2017 | Tanizaki | | G06F 15/163 |
| 2017/0310841 A1 | 10/2017 | Shibukawa et al. | | |
| 2017/0322759 A1* | 11/2017 | Tokuchi | | G06F 3/14 |
| 2017/0357468 A1 | 12/2017 | Tanizaki et al. | | |
| 2018/0013903 A1* | 1/2018 | Koshigaya | | H04N 1/00413 |
| 2018/0015755 A1* | 1/2018 | Yamada | | H04W 12/06 |
| 2018/0069987 A1* | 3/2018 | Numakura | | H04N 1/00307 |
| 2018/0077300 A1* | 3/2018 | Asai | | H04N 1/2166 |
| 2019/0306363 A1* | 10/2019 | Tanizaki | | H04N 1/00973 |

FOREIGN PATENT DOCUMENTS

| | | | |
|---|---|---|---|
| JP | 2014-049910 | | 3/2014 |
| JP | 2014049910 A | * | 3/2014 |

* cited by examiner

INFORMATION PROCESSING DEVICE, INFORMATION PROCESSING METHOD, NON-TRANSITORY RECORDING MEDIUM, AND IMAGE FORMING SYSTEM

CROSS-REFERENCE TO RELATED APPLICATIONS

This patent application is based on and claims priority pursuant to 35 U.S.C. § 119(a) to Japanese Patent Application Nos. 2018-070383, filed on Mar. 30, 2018, and 2018-180559, filed on Sep. 26, 2018, in the Japan Patent Office, the entire disclosures of which are hereby incorporated by reference herein.

BACKGROUND

Technical Field

The present disclosure relates to an information processing device, an information processing method, a non-transitory a recording medium storing instructions for executing an information processing method, and an image forming system.

Related Art

A portable terminal device being capable of communicating with a communication target device such as an image forming apparatus, is installed with a cooperative application that operates in cooperation with the image forming apparatus to execute processing from a side of the portable terminal device.

SUMMARY

An exemplary embodiment of the present disclosure includes an information processing device including a memory and a processor. An information processing device includes a memory and a processor. The memory stores a first application. The first application is executable on the information processing device that operates in a first operating environment or a second operating environment and is capable of communicating with a second application. The processor obtains communication connection information on a communication connection with a communication target device currently communicated with the information processing device, based on a determination that the information processing device operates in the first operating environment. The communication connection information has been acquired by the second application that controls the communication connection established between the information processing device and the communication target device. The processor further executes the first application to transmit, to the communication target device, a function execution request for executing a function of the communication target device, based on the communication connection information that is obtained.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
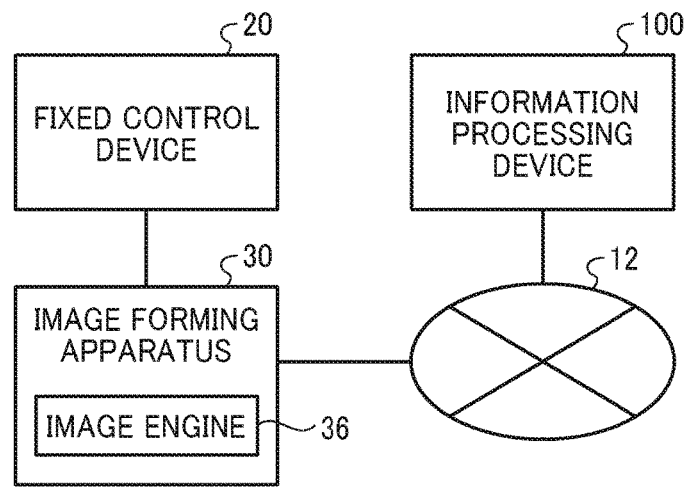
FIG. 1 is a block diagram illustrating a system configuration of an image forming system according to an embodiment of the disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Hereinafter, embodiments of the present disclosure are described with reference to the attached drawings.

System Configuration of Image Forming System

FIG. 1 is a block diagram illustrating a system configuration of an image forming system 10 according to an embodiment of the disclosure. As illustrated in FIG. 1, the image forming system 10 includes a fixed control device 20, an image forming apparatus 30, and an information processing device 100. The above-mentioned devices are connected to a network 12. As an example of the network 12, a local area network (LAN), a virtual private network (VPN), or the Internet, or any combination thereof, may be used.

The image forming apparatus 30 is a device that provides a specific function to the fixed control device 20 and the information processing device 100. As an example of the image forming apparatus 30, a multifunctional peripheral (MFP) may be used. The MFP is a device that has a plurality of image processing functions including a copying function, a scanning function, a facsimile communication function, and a printing function. That is, the image forming apparatus 30 has an image processing engine 36 including a plotter, a scanner, and the like.

The specific function provided by the image forming apparatus 30 may be any desired function. For example, the specific function is a function to execute a workflow for a job. Hereinafter, the function to execute a workflow for a job is also referred to as a workflow function. The workflow includes plural workflow processes determined in advance and, when executed, the plural workflow processes are sequentially performed in a predetermined order. As an example of the workflow, image data is generated by the scanning function and then transmitted to a device that is a source of an execution request, which is a request to execute the workflow.

The fixed control device 20 is a terminal device that is used by a user. The fixed control device 20 includes an input device operated by the user and a display device for displaying various kinds of information. In this disclosure, the fixed control device 20 is directly and fixedly connected to the image forming apparatus 30. In one example, the fixed control device 20 is directly connected to the image forming apparatus 30 via, for example, a cable to enable direct communication with the image forming apparatus 30. Alternatively, the fixed control device 20 is incorporated into the image forming apparatus 30 to operate as a device internally provided in the image forming apparatus 30 to enable communication with other devices in the image forming apparatus 30. In another example, the fixed control device 20 is assigned with a static address, such that its host name or port number remains unchanged. With this configuration, the fixed control device 20 can execute the specific function (for example, the workflow function) provided by the image forming apparatus 30. For example, when the image forming apparatus 30 is an MFP as described above, the fixed control device 20 can execute each of the plurality of image processing functions of the MFP. In some embodiments, the fixed control device 20 may be detachably connected to the image forming apparatus 30.

The information processing device 100 is a terminal device that is used by a user. By installing a plurality of applications, the information processing device 100 can implement a plurality of functions provided by the plurality of applications. The information processing device 100 can communicate with the image forming apparatus 30 directly via a cable, or through the network 12. With this configuration, the information processing device 100 can execute the specific function (for example, the workflow function) provided by the image forming apparatus 30. Examples of the information processing device 100 include a personal computer, a tablet terminal, a smartphone, a mobile phone, and a personal digital assistant (PDA).

Hardware Configuration of Information Processing Device

Figure 2:
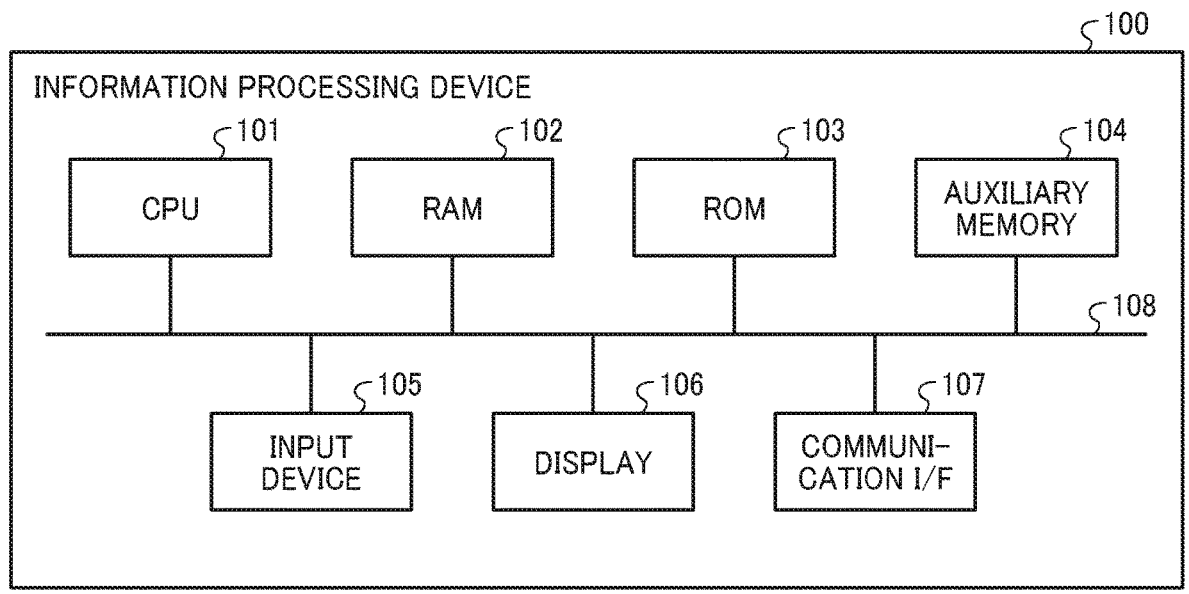
FIG. 2 is a block diagram illustrating a hardware configuration of an information processing device according to an embodiment of the disclosure.

FIG. 2 is a block diagram illustrating a hardware configuration of the information processing device 100 according to the present embodiment of the disclosure. As illustrated in FIG. 2, the information processing device 100 includes a central processing unit (CPU) 101, a read only memory (ROM) 102, a random access memory (RAM) 103, an auxiliary memory 104, an input device 105, a display 106, and a communication interface (I/F) 107. The above-mentioned hardware components are connected to each other through a bus 108.

The CPU 101 executes various programs stored in the ROM 102 or the auxiliary memory 104. The ROM 102 is a nonvolatile memory. The ROM 102 stores various programs executed by the CPU 101 and data necessary for the CPU 101 to execute each of the programs, for example. The RAM 103 is a storage device such as a dynamic random access memory (DRAM) or a static random access memory (SRAM), which functions as a main storage device in this example. The RAM 103 serves as a work area when the CPU 101 executes a program, for example. The auxiliary memory 104 is a nonvolatile auxiliary storage device, such as a flash memory. The auxiliary memory 104 stores various programs executed by the CPU 101 and data necessary for the CPU 101 to execute each of the programs, for example.

The input device 105 inputs various kinds of information by being operated by the user. As an example of the input device 105, a mouse, a keyboard, or a touch panel may be used. The display 106 displays various kinds of information. As an example of the display 106, a liquid crystal display or an organic electro luminescence (EL) display may be used. The communication I/F 107 is an interface for communicating with an external information processing device (for example, the image forming apparatus 30) through the network 12. Examples of communication methods used by the communication I/F 107 include Ethernet (registered trademark) and wireless LAN, and Bluetooth (registered trademark).

The fixed control device 20 is substantially similar to the information processing device 100 in hardware structure. In the fixed control device 20, however, the communication I/F 107 is an interface for communicating with an external information processing device (for example, the image forming apparatus 30) through a communication line such as a cable.

Figure 3A:
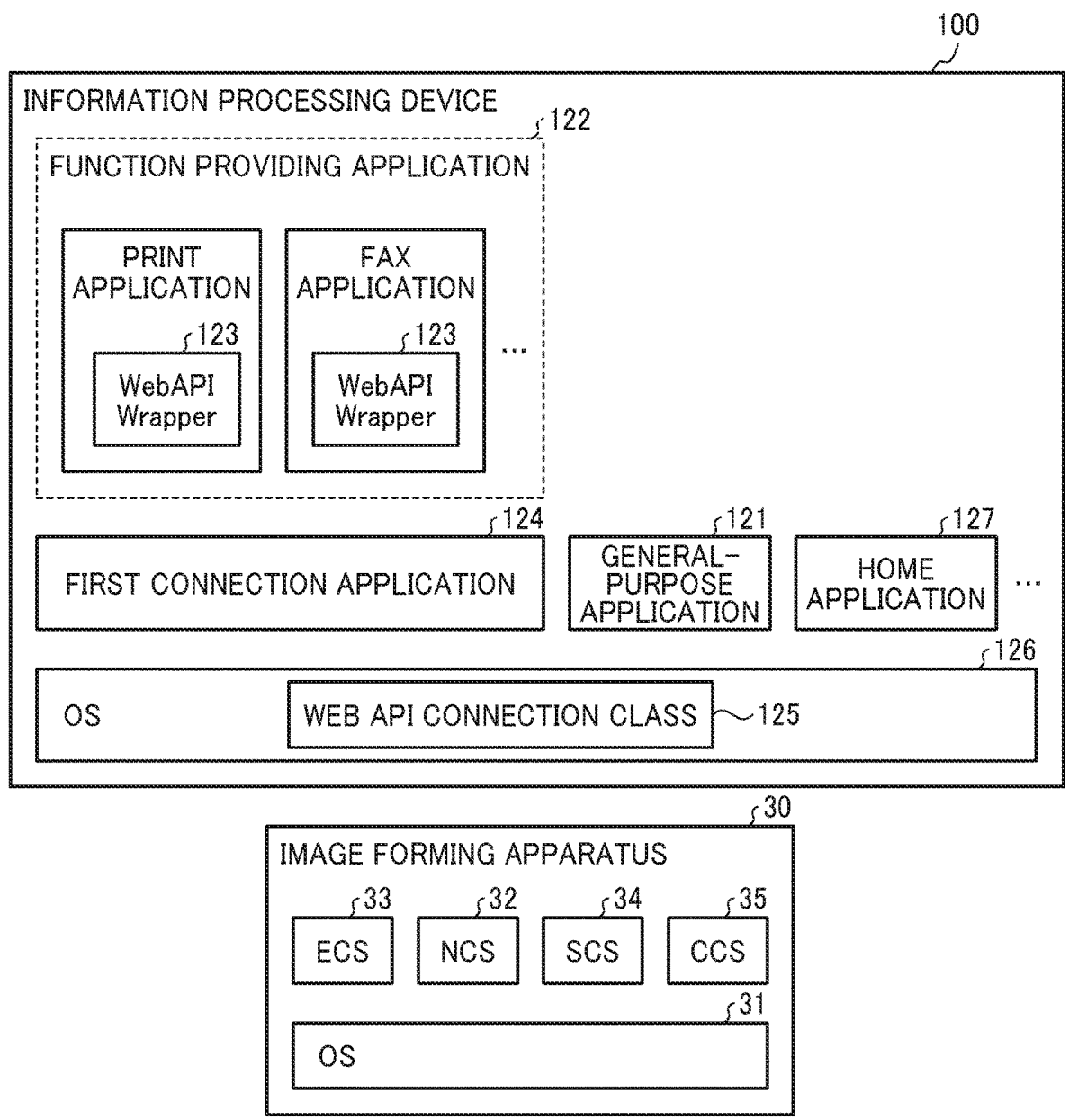
FIG. 3A and FIG. 3B are block diagrams respectively illustrating a functional configuration of an information processing device and a functional configuration of a fixed control device according to an embodiment of the disclosure.
Figure 3B:
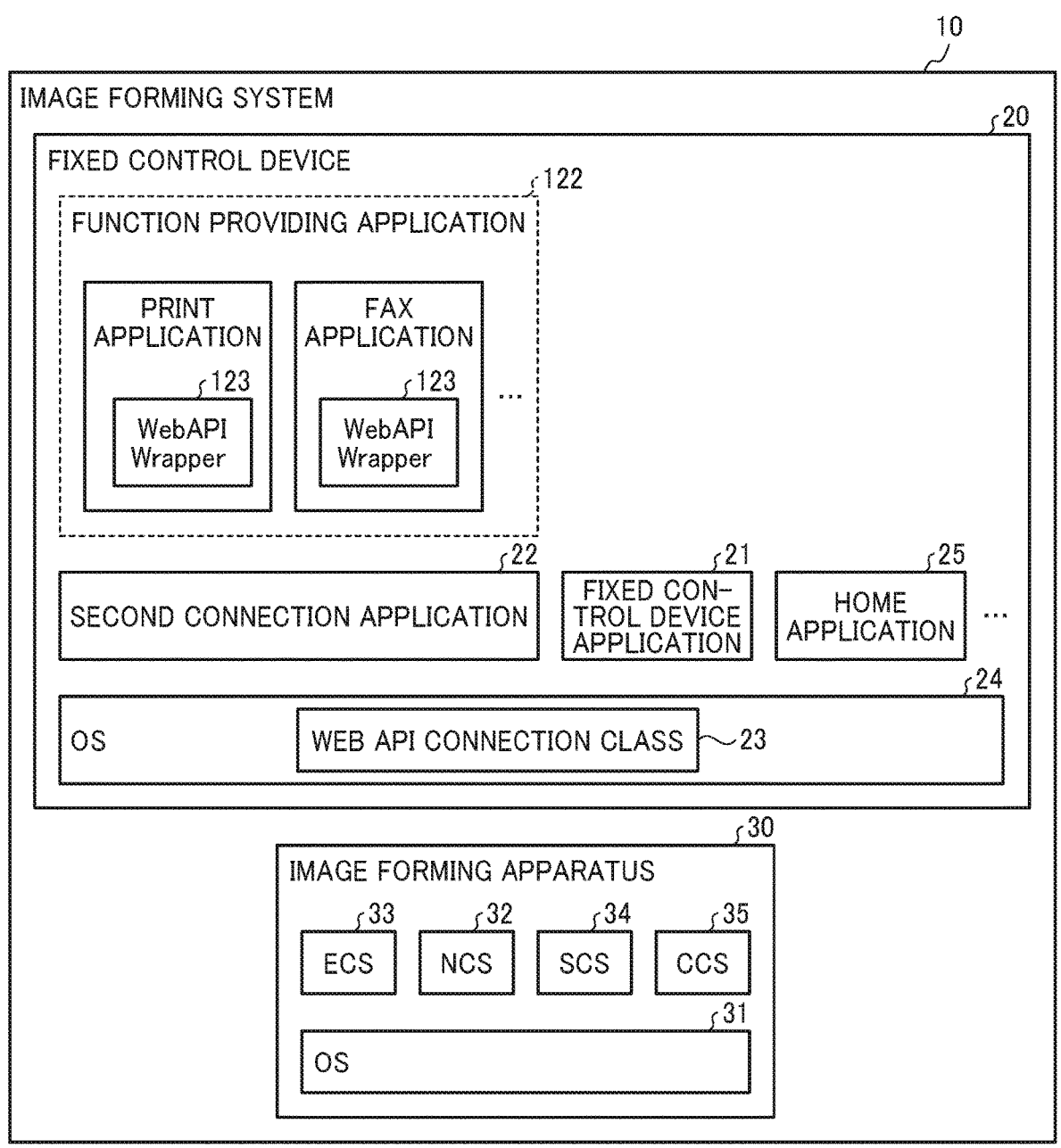

Functional Configuration of Information Processing Device and Fixed Control Device FIG. 3A and FIG. 3B are block diagrams respectively illustrating a functional configuration of the information processing device 100 and a functional configuration of the fixed control device 20, according to the present embodiment of the disclosure.

As illustrated in FIG. 3A, the information processing device 100 includes an operating system (OS) 126, a first connection application 124, a function providing application 122, and a general-purpose application 121. The OS 126 provides an interface of hardware function to various kinds of software. As an example of the OS 126, Android (registered trademark) may be used. In addition, the OS 126 has a web application programming interface (API) connection class 125 as one of the functions. The web API connection class 125 may be implemented by software that is different from the OS 126. The OS 126 may include various applications required for the system operation.

The general-purpose application 121 is installable on and usable with the information processing device 100. Examples of the general-purpose application 121 include an image processing application and a mail application. The information processing device 100 may be installed with a plurality of general-purpose applications 121 each of which provides a function, and the functions of the plurality of general-purpose applications 121 may be different from each other. In addition, as one of the plurality of general-purpose applications 121, the home application 127 may be installed on the information processing device 100.

The home application 127 displays a main screen on the display 106 of the information processing device 100 and a display of the fixed control device 20. The home application 127 activates the function providing application 122 or the general-purpose application 121 according to a user operation of pressing an icon corresponding to the function providing application 122 or the general-purpose application 121, performed on the main screen. Here, pressing any icon or button includes any action taken by a user to operate in relation to the icon or button, for example, tapping or clicking the icon or button. For example, the home application 127 activates the function providing application 122 or the general-purpose application 121 by transmitting, to the function providing application 122 or the general-purpose application 121, an instruction signal instructing to activate the function providing application 122 or the general-purpose application 121.

The user may activate a desired one of the function providing applications 122 or a desired one of the general-purpose applications 121 without using the home application 127. The user may activate the desired one of the function providing applications 122 or the desired one of the general-purpose application 121 from another one of the function providing applications 122 or another one of the general-purpose applications 121. Alternatively, the home application 127 may display only the function providing application 122 on the main screen. Alternatively, instead of providing the home application 127, another application such as the first connection application 124 or the function providing application 122 may be provided, which operates as the home application 127.

The function providing application 122 is an application executable on both of the fixed control device 20 and the information processing device 100. A plurality of function providing applications 122 can be installed on the fixed control device 20a and the information processing device 100. Each of the plurality of function providing applications 122 has a function, and the functions of the plurality of function providing applications 122 may be different from each other. For example, when a communication target device to which the information processing device 100 is communicably connected is the image forming apparatus (MFP) 30, the function providing application 122 is an application for providing a user interface screen for setting and instructing to execute processing of each of the functions, such as the copying function, the scanning function, the printing function, and the facsimile communication function, executed with the MFP 30. For example, a print application and a fax application can provide a user interface screen for setting and instructing execution in relation to the printing function and the facsimile communication function, respectively.

Each function providing application 122 includes a web API wrapper 123. The web API wrapper 123 is a library that provides a class that wraps the web API connection class 125 so that the function providing application 122 is communicably connected to the image forming apparatus 30 regardless of an operating environment. With this configuration, the function providing application 122 generates an instance of the web API wrapper 123, thereby acquiring, from the first connection application 124, information on a communication connection with the image forming apparatus 30 that is currently connected to the information processing device 100, and transmits, using the information on the communication connection, an execution request to the image forming apparatus 30 to execute a function (also referred to as a function execution request). Hereinafter, the information on a communication connection is also referred to as communication connection information. The communication connection information includes, for example, a host name of a connection destination, a port number of the connection destination, etc.

A first acquisition unit 401a, a second acquisition unit 401b, a determination unit 402, a setting unit 403, and an execution request unit 404, which are described later, are functions that are implemented by the function providing application 122. The setting unit 403 and the execution request unit 404 are implemented by the web API wrapper 123.

In this example, the function providing application 122 may add authentication information (for example, a user identifier (ID) and a password) to be used for performing user authentication to the function execution request transmitted to the image forming apparatus 30, depending on a terminal device on which the function providing application 122 is installed. In addition, the function providing application 122 is capable of selectively switching a protocol, between Hypertext Transfer Protocol (HTTP) and Hypertext Transfer Protocol Secure (HTTPS), to be used for transmitting the function execution request to the image forming apparatus 30 according to the terminal device on which the function providing application 122 is installed. The web API connection class 125 may be included in the function providing application 122. In addition, as the first web API connection class 125, a function implemented on Android (registered trademark) or the like may be used.

The first connection application 124 is an application that is generated to be, at least, installed on the information processing device 100 and executed in the information processing device 100. The first connection application 124 establishes a communication connection with the image forming apparatus 30. In addition, the first connection application 124 provides the information on the communication connection with the image forming apparatus 30 to the web API wrapper 123.

In addition, the first connection application 124 may have a function of generating a home screen for displaying a list of icons of the function providing applications 122 installed on the information processing device 100. In addition, the first connection application 124 may have a function of displaying a screen for selecting one of the image forming apparatuses 30 to be communicably connected to the information processing device 100, or a screen for receiving authentication information required for logging in to the selected image forming apparatus 30.

Referring to FIG. 3B, the image forming system 10 includes the fixed control device 20 and the image forming apparatus 30. The fixed control device 20 may be detachably provided to the image forming apparatus 30. In addition to being communicably connected to the image forming apparatus 30 through a signal line, the fixed control device 20 may be communicably connected to another image forming apparatus by a wireless communication. The fixed control device 20 includes an OS 24, a second connection application 22, the function providing application 122, a fixed control device application 21, and a home application 25. The OS 24 provides an interface of hardware function to various kinds of software. As an example of the OS 24, Android (registered trademark) may be used. In addition, the OS 24 has a web API connection class 23 as one of the functions. The web API connection class 23 may be implemented by software that is different from the OS 24. The OS 24 may be an OS that is customized for operating the fixed control device 20 or may include various applications required for the system operation.

The fixed control device application 21 is an application dedicated to the fixed control device 20. For example, when a communication target device to which the fixed control device 20 is communicably connected is the image forming apparatus (MFP) 30, the fixed control device application 21 is an application for providing a user interface screen for setting and instructing to execute processing of each of the functions, such as the copying function, the scanning function, the printing function, and the facsimile communication function, executed with the MFP 30. The fixed control device 20 may also have a fixed control device platform to execute the fixed control device application 21. When the fixed control device 20 has the fixed control device platform, the fixed control device platform may include a part or all of the functions of the second connection application 22 or may be provided separately from the second connection application 22.

The function providing application 122 and the web API wrapper 123 of the fixed control device 20 are the same as the function providing application 122 and the web API wrapper 123 of the information processing device 100.

The second connection application 22 and the second web API connection class 23 of the fixed control device 20 are not the same as the first connection application 124 and the first web API connection class 125 of the information processing device 100, but provide functions almost the same as or similar to those of the first connection application 124 and the first web API connection class 125 of the information processing device 100. However, the second connection application 22 and the web API connection class 23 perform processing unique to the fixed control device 20, and the first connection application 124 and the web API connection class 125 perform processing unique to the information processing device 100. That is, the second connection application 22 is an application that is generated to be installed and executed, at least, on the fixed control device 20. In the following description, when being unnecessary to distinguish from each other, the first connection application 124 and the second connection application 22 are collectively or individually referred to as connection applications or a connection application.

As illustrated in FIG. 3A and FIG. 3B, the image forming apparatus 30 includes an OS 31, an Engine control Service (ECS) 33, a network control service (NCS) 32, a system control service (SCS) 34, and certification control service (CCS) 35. The OS 31 is different from the OS 126 of the information processing device 100 and the OS 24 of the fixed control device 20 and operates independently of the OS 126 and the OS 24.

The ECS 33 manages and arbitrates hardware that is the image processing engine 36 including the plotter and the scanner, for example.

The NCS 32 manages and arbitrates hardware that is a network I/F of the image forming apparatus 30. In addition, the NCS 32 receives web API requests (for example, HTTP requests, HTTPS requests, etc.) from the web API connection class 125 and the web API connection class 23.

The SCS 34 manages the overall operation of the system, such as restoration from an energy saving mode and job management and controls, for example, a counter, a screen, and settings of the image forming apparatus 30 and the fixed control device 20.

The CCS 35 manages user authentication, authentication status, and usage restriction, of the image forming apparatus 30 and the fixed control device 20.

Each of the ECS 33, the NCS 32, the SCS 34, the CCS 35, the OS 31, and the image processing engine 36 is an example to implement a functional unit to execute a predetermined function. In addition to the above, there may be a functional unit that includes software or hardware for providing various functions such as the copying function, the scanning function, the printing function, or facsimile communication function, for example.

The image forming apparatus 30 is an example of the communication target device, and the communication target device communicates with the information processing device 100 or the fixed control device 20. The communication target device is not limited to the image forming apparatus 30, and various electronic apparatuses such as an electronic whiteboard and an office apparatus including a projector may be used as the communication target devices.

The advantages for separately providing the function providing application 122 and each of the first connection application 124 and the second connection application 22 in each of the information processing device 100 and the fixed control device 20 illustrated in FIG. 3A and FIG. 3B, respectively, is described below. The function providing application 122 is often produced by a third-party that is different from a manufacturer of a device such as the image forming apparatus 30. Accordingly, by providing each of the first connection application 124 and the second connection application 22 for establishing the connection to the image forming apparatus 30 separately from the function providing application 122, the function providing application 122 can be generated in a simple manner. In addition, each of the first connection application 124 and the second connection application 22 can implement processing unique to the corresponding device (fixed control device 20 or the information processing device 100) in connecting to the image forming apparatus 30. This allows the function providing application 122 to be implemented with processing common to both of the devices (fixed control device 20 and the information processing device 100). Namely, there is no need to generate the function providing application 122 for each device, resulting in simplification in generating the function providing application 122.

Having said, an entity for developing the function providing application 122 may be the same as an entity for manufacturing the device such as the image forming apparatus 30. For example, a development team for developing the function providing application 122 may sometimes differ from a team for manufacturing the device such as the image forming apparatus 30.

Each of the function unit of the information processing device 100 described above is implemented, for example, by the CPU 101 executing a program stored in the ROM 103 or the auxiliary memory 104, on the information processing device 100. The program executed by the CPU 101 may be provided in (installed on) the information processing device 100 in advance or provided in (installed on) the information processing device 100 from the outside of the information processing device 100. When the program is provided from the outside of the information processing device 100, a recording medium, such as universal serial bus (USB) memory, a memory card, and compact disc read only memory (CD-ROM), storing the program may be provided, or the program may be downloaded from a server on a network, such as the Internet.

Figure 4:
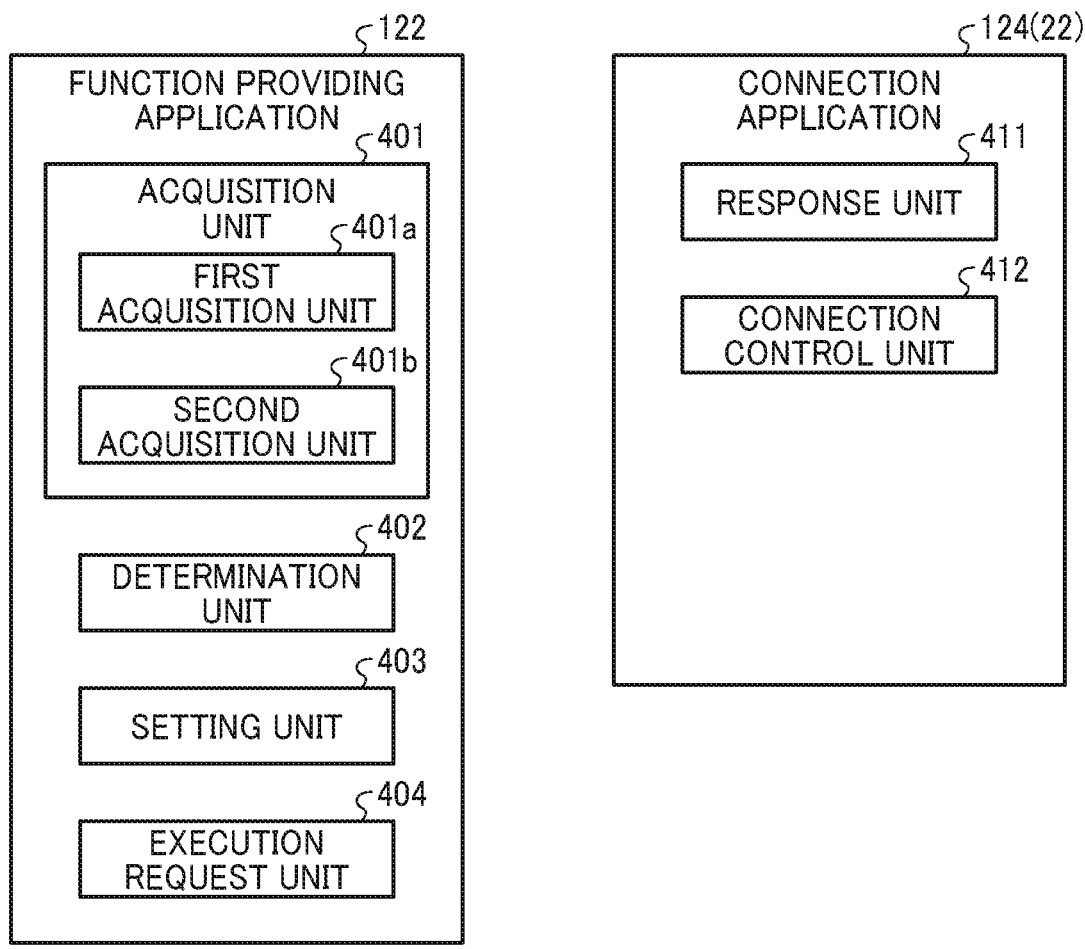
FIG. 4 is a block diagram illustrating functions of a function providing application and a connection application according to an embodiment of the disclosure.

FIG. 4 is a block diagram illustrating functions of the function providing application 122 and the connection application (the first connection application 124, the second connection application 22). As illustrated in FIG. 4, the function providing application 122 includes an acquisition unit 401, the determination unit 402, the setting unit 403, and the execution request unit 404. In addition, each of the first connection application 124 and the second connection application 22 includes a response unit 411 and a connection control unit 412. In the following description of the embodiment, a part or all of the functions of the web API wrapper 123 are described as functions of the function providing application 122.

The acquisition unit 401 acquires various kinds of information from the response unit 411 by making an inquiry to the response unit 411. For example, the acquisition unit 401 acquires, from the response unit 411, environment information indicating an operating environment of the device on which the function providing application 122 is installed, and the communication connection information that is information on a communication connection with the image forming apparatus 30 currently connected. When the determination unit 402 determines that the communication connection information is required to be acquired, the acquisition unit 401 acquires the communication connection information from the response unit 411. On the other hand, when the determination unit 402 determines that the communication connection information is not required to be acquired, the acquisition unit 401 does not acquire the communication connection information. In addition, the operating environment included in the environment information includes a first operating environment and a second operating environment. In the first operating environment, for example, the information processing device 100 is communicably connected to the image forming apparatus 30 by a wireless communication, namely, the information processing device 100 can be communicably connected to a plurality of image forming apparatuses 30. As an example of the first operating environment, a smart device or a client PC can be used. That is, for example, the client PC using a network is connected to an MFP by a wired cable. In other words, the client PC may be connectable to a plurality of MFPs by a network in the first operating environment. In the second operating environment, for example, the fixed control device 20 is communicably connected to the image forming apparatus 30 by a priority communication. That is, the fixed control device 20 is directly and fixedly connected to the image forming apparatus 30. In other words, the fixed control device 20 is not detachable, but installed with the image forming apparatus 30 such that the fixed control device 20 is assigned with a static address to be fixed to the image forming apparatus 30 at any time and a communication target of the fixed control device 20 is limited to the image forming apparatus 30 in the second operating environment. In addition, the communication connection information includes a connection host name, a connection port number, and authentication information, corresponding to the image forming apparatus 30. In addition, for example, in the first operating environment, information processing device may be connected to the communication target device using the communication connection information that has been input by a user operation, and, in the second operating environment, the fixed control device 20 may be connected to the image forming apparatus 30 using the communication connection information that is previously stored in a memory. In addition, the acquisition unit 401 includes the first acquisition unit 401a and the second acquisition unit 401b.

The determination unit 402 determines whether the communication connection information is required to be acquired from the acquisition unit 401 based on the environment information acquired by the acquisition unit 401 from the response unit 411. For example, when an environment in which the function providing application 122 is executed is on the information processing device 100, the determination unit 402 determines that the communication connection information is required to be acquired and instructs the acquisition unit 401 to make an inquiry for the communication connection information. On the other hand, when an environment in which the function providing application 122 is executed is on the fixed control device 20, the determination unit 402 determines that the communication connection information is not required to be acquired.

The setting unit 403 sets parameters for an execution request to be transmitted to the image forming apparatus 30, based on the various kinds of information acquired by the acquisition unit 401. The parameters settable by the setting unit 403 include a connection host name and a connection port number. In addition, the setting unit 403 may generate one of an HTTP request and an HTTPS request based on the information acquired from the acquisition unit 401. That is, the setting unit 403 can generate the execution request by setting the parameters to be included in the web API request or converting or generating the web API request.

The execution request unit 404 transmits, as the execution request, the various kinds of information acquired by the acquisition unit 401 and the parameters set or the web API request generated by the setting unit 403 to the image forming apparatus 30. In addition, the execution request unit 404 can transmit the execution request to the image forming apparatus 30 via the web API connection class 125 or the web API connection class 23, but this is not intended to be limiting the embodiments, and the execution request unit 404 may transmit the execution request to the image forming apparatus 30 using another program, for example.

The response unit 411 transmits various kinds of information in response to the inquiry received from the acquisition unit 401. For example, the response unit 411 transmits an operating environment, a connection host name, a connection port number, or authentication information to the acquisition unit 401.

The connection control unit 412 controls, namely establishes, a connection with the image forming apparatus 30. For example, when each of the first connection application 124 and the second connection application 22 is activated, a screen for receiving an input of a host name or an internet protocol (IP) address is displayed. The connection control unit 412 establishes a connection with the image forming apparatus 30 based on acquired device information such as the host name or the IP address. In addition, when the connection with the image forming apparatus 30 is established, the connection control unit 412 stores the information input from a user and information acquired from the image forming apparatus 30. For example, the connection control unit 412 can store a connection host name, a port number, or authentication information.

The functions of the function providing application 122, and the functions of the corresponding one of the first connection application 124 and the second connection application 22, which are described above, should be included in the information processing device 100 and the fixed control device 20. Accordingly, an execution entity to execute each function is not limited, and a part of processing to execute the functions or a part of the functions may be executed by different software, or another application, such as an OS. In addition, a part of the functions of the function providing application 122 may be executed by the first connection application 124 or the second connection application 22. On the contrary, a part of the functions of the first connection application 124 or the second connection application 22 may be executed by the function providing application 122.

Process Performed by Image Forming System 10
(First Example)

Figure 5:
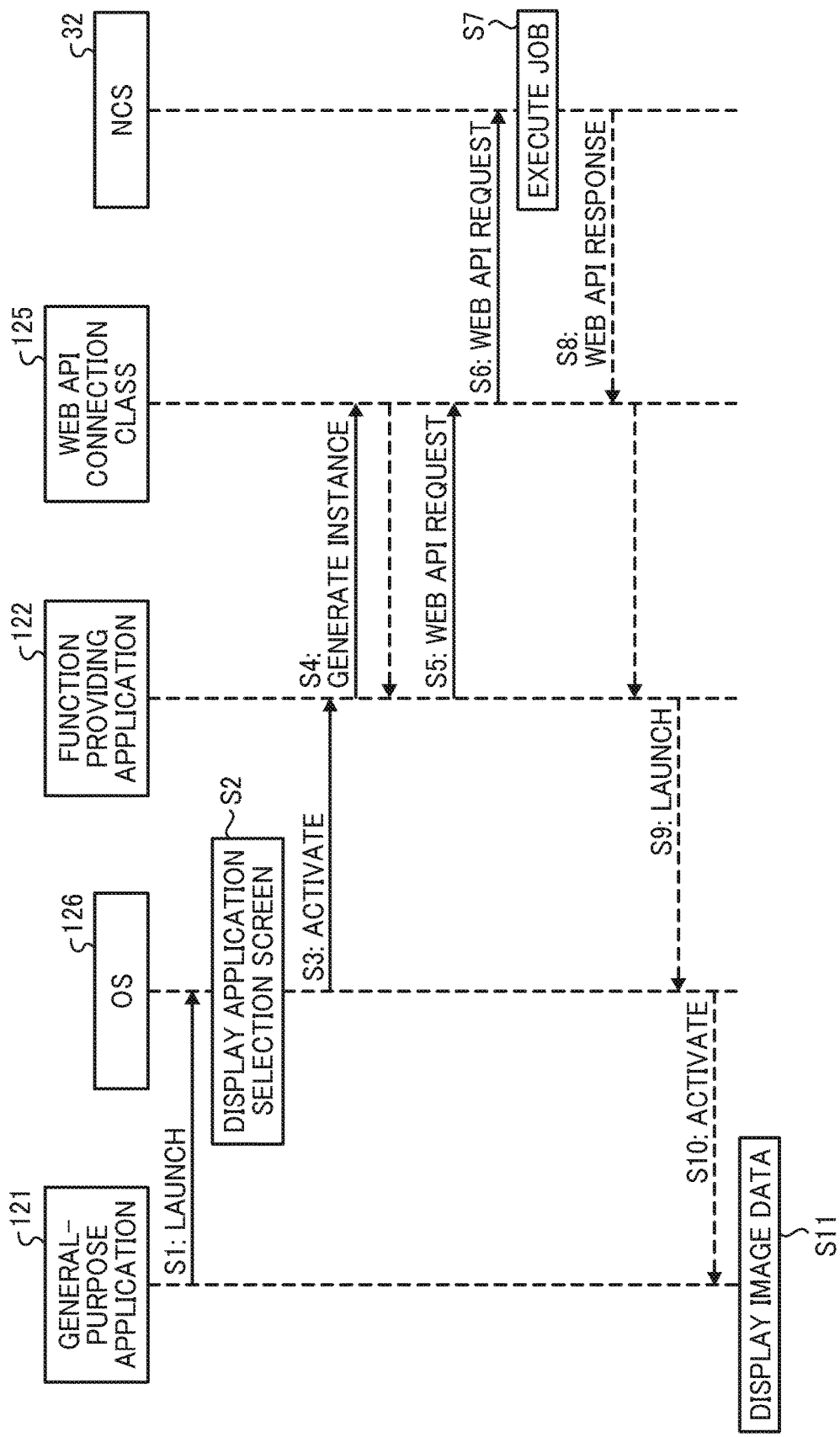
FIG. 5 is a sequence diagram illustrating a first example of a process performed by an image forming system according to an embodiment of the disclosure.

FIG. 5 is a sequence diagram illustrating a first example of a process performed by the image forming system 10 according to the present embodiment of the disclosure. In the following description of the first example, the image forming system 10 executes a scan job in response to a request from the general-purpose application 121 of the information processing device 100.

In the information processing device 100, the general-purpose application 121 launches, from the OS 126, an application with which the general-purpose application 121 is to cooperate (Step S1). The general-purpose application 121 requests the OS 126 by designating, using an intent, conditions on the application to be launched. In addition, the OS 126 can set an intent filter with which the conditions for launching an application by the intent can be set, in advance.

Subsequently, the OS 126 determines whether there is an application that has an intent filter satisfying the conditions designated by the general-purpose application 121 or not. When there is a plurality of applications each of which has the intent filter satisfying the conditions, the OS 126 displays an application selection screen on the display device to receive a selection from a user (Step S2).

When the user selects one of the plurality of applications on the application selection screen, the OS 126 activates the selected application (Step S3). In the example of FIG. 5, the function providing application 122 is activated as an application for executing the scan job.

Subsequently, the function providing application 122 generates an instance of the web API connection class 125 (Step S4). The function providing application 122 transmits a web API request to the generated instance of the web API connection class 125 (Step S5). In the example of FIG. 5, the web API request is transmitted as an execution request to execute the scan job.

The web API connection class 125 transmits the web API request received from the function providing application 122 to the NCS 32 of the image forming apparatus 30 (Step S6).

When the NCS 32 receives the web API request, which is transmitted from the web API connection class 125, the image forming apparatus 30 executes processing to implement a function according to the web API request (Step S7). In the example of FIG. 5, the image forming apparatus 30 executes reading of a document based on the execution request to execute the scan job.

Then, the NCS 32 transmits a web API response to the function providing application 122 via the web API application class 125 (Step S8). In the example of FIG. 5, the NCS 32 transmits, to the function providing application 122, image data generated by reading the document by the scan function, as a result of execution of the scan job, which is the web API response.

More specifically, the NCS 32 transmits job information including information indicating whether the scan job is successfully completed (successful or failed) to the function providing application 122 in addition to the image data. The NCS 32 may also transmit, to the function providing application 122, information, such as address information, on a storage area in which the image data is stored. The image data may be one of image data transmitted from the NCS 32 to the auxiliary memory 104 of the information processing device 100, image data stored in the image forming apparatus 30, and image data transmitted to an external server connected to the image forming apparatus 30. Then, the function providing application 122 transmits a part or all of the various kinds of information (image data, job information, information on a storage area of image data, etc.) received from the NCS 32 to the general-purpose application 121.

The function providing application 122 may request the OS 126 to designate, using the intent, the general-purpose application 121 as an application to be launched and to designate information required for displaying the image data with the general-purpose application 121 (Step S9).

The OS 126 activates the general-purpose application 121 designated by the function providing application 122 and transmits the information required for displaying the image data to the general-purpose application 121 (Step S10).

The general-purpose application 121 causes the image data to be displayed on a screen based on the information acquired from the OS 126 (Step S11). Instead of displaying the image data, the general-purpose application 121 can perform another kind of processing such as transmitting the image data to a predetermined server or performing processing on the image data, depending on the corresponding function of the general-purpose application 121.

A detailed description of processing of S4 to S7 is deferred.

The job executable in response to the request from the general-purpose application 121 is not limited to a scan job. Examples of the job executable in response to the request from the general-purpose application 121 include various kinds of image processing, such as copying and printing, reading data from each kind of storage device (for example, an HDD of the image forming apparatus 30 or an HDD of a cloud server connected to the image forming apparatus 30 via the network 12), and editing data.

In addition, in the example of FIG. 5, when the user operates in relation to a screen provided by the general-purpose application 121, the general-purpose application 121 receives an instruction to execute a job, and the general-purpose application 121 transmits an execution request to execute the job to the function providing application 122. However, the embodiments of the disclosure are not limited to this. For example, the user may perform operation on a screen provided by the function providing application 122 and the function providing application 122 may receive an instruction to execute a job and transmit an execution request to execute the job.

In addition, in the example of FIG. 5, the function providing application 122 includes the web API wrapper 123 and the web API connection class 125. However, in the figures following to FIG. 5, apart from the function providing application 122, the web API wrapper 123 and the web API connection class 125 may be illustrated.

Process Performed by Image Forming System 10 (Second Example)

Figure 6:
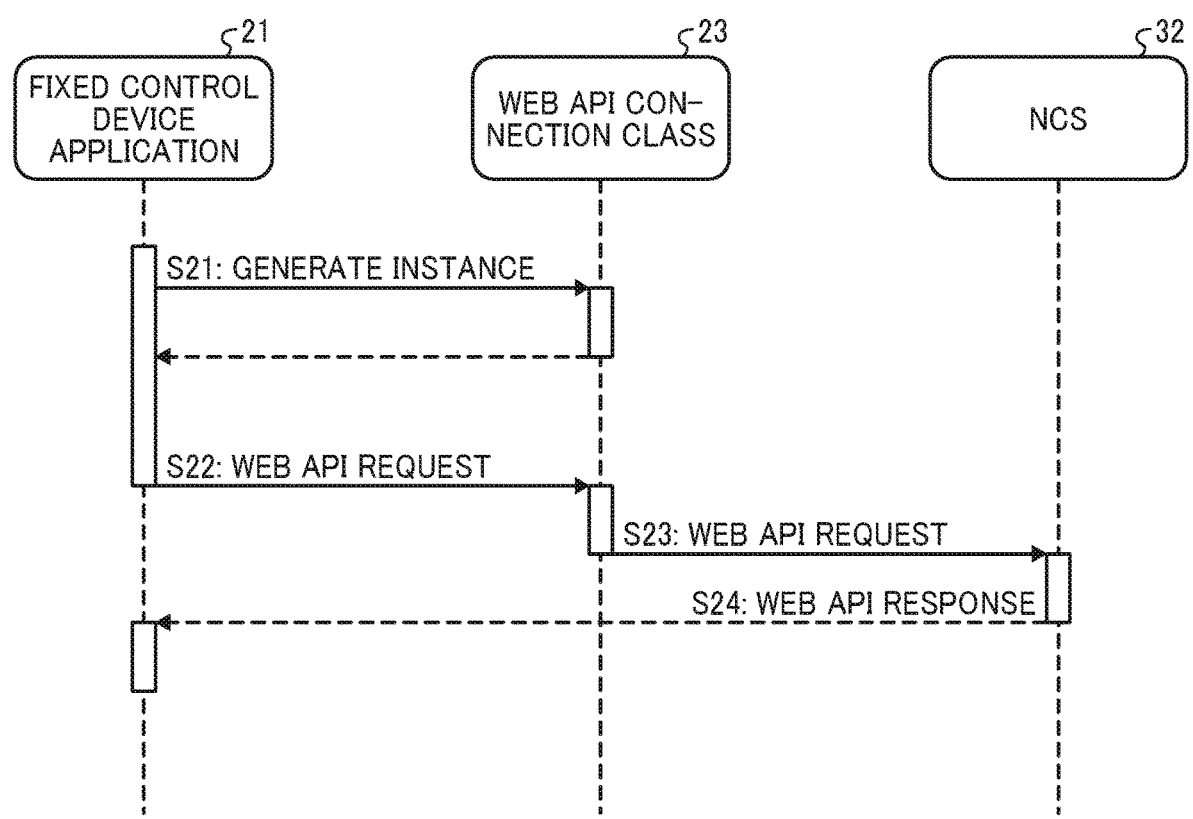
FIG. 6 is a sequence diagram illustrating a second example of a process performed by an image forming system according to an embodiment of the disclosure.

FIG. 6 is a sequence diagram illustrating a second example of the process performed by the image forming system 10 according to the present embodiment of the disclosure. In the following description of the second example, the image forming system 10 executes a function of the image forming apparatus 30 while identifying a host name of a connection destination, in response to a request from the fixed control device application 21 of the fixed control device 20. In the second example described below, the function of the image forming apparatus 30 is executed without using the function providing application 122.

In the fixed control device 20, the fixed control device application 21 generates an instance of the web API connection class 23 (Step S21). Subsequently, the fixed control device application 21 transmits, to the generated instance of the web API connection class 23, a web API request with a parameter of a host name of a connection destination of the fixed control device 20 (Step S22). The web API connection class 23 transmits, to the NCS 32 of the image forming apparatus 30, the web API request received from the fixed control device application 21 (Step S23). Upon receiving the web API request transmitted from the web API connection class 23 by the NCS 32, the image forming apparatus 30 executes a function corresponding to the web API request, and then the NCS 32 transmits a web API response to the fixed control device application 21 (Step S24).

Process Performed by Image Forming System 10 (Third Example)

Figure 7:
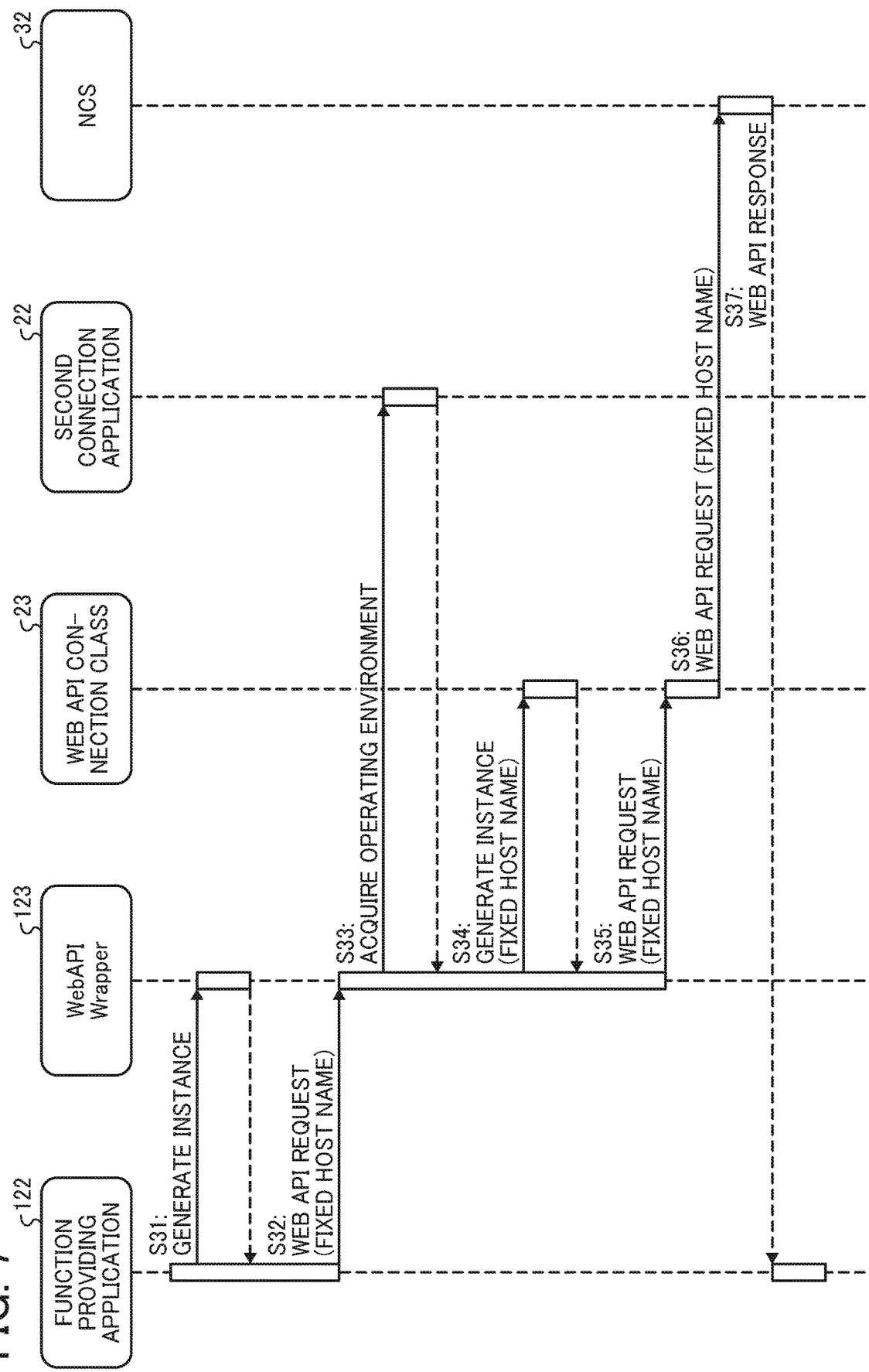
FIG. 7 is a sequence diagram illustrating a third example of a process performed by an image forming system according to an embodiment of the disclosure.

FIG. 7 is a sequence diagram illustrating a third example of the process performed by the image forming system 10 according to the present embodiment of the disclosure. In the following description of the third example, the image forming system 10 executes a function of the image forming apparatus 30 while identifying a host name of a connection destination, in response to a request from the function providing application 122 of the fixed control device 20. Namely, in the third example described below, the function of the image forming apparatus 30 is executed by the function providing application 122 of the fixed control device 20.

In the fixed control device 20, the function providing application 122 generates an instance of the web API wrapper 123 to use the web API connection class 23 (Step S31). Subsequently, the function providing application 122 transmits, to the generated instance of the web API wrapper 123, a web API request with a parameter of a host name of a connection destination of the fixed control device 20 (Step S32). The function providing application 122 stores the host name of the connection destination of the fixed control device 20, in advance. For example, the host name of the connection destination of the fixed control device 20 may be described in the program of the function providing application 122. However, the embodiments are not limited to this, and a user may set a host name for each function providing application 122 via the input device, in advance.

Upon receiving the web API request transmitted from the function providing application 122, the web API wrapper 123 acquires information on the operating environment from the second connection application 22 (Step S33). Subsequently, the web API wrapper 123 determines whether the host name of the connection destination is fixed (static) or variable (that is, whether the device on which the processing is being performed is the fixed control device 20 or the information processing device 100), based on the information on the operating environment. In the example of FIG. 7, the web API wrapper 123 determines that the host name of the connection destination is fixed (that is, the device on which the processing is being performed is the fixed control device 20). Here, the second connection application 22 stores information indicating whether the device is the fixed control device 20 or the information processing device 100, in advance. For example, the second connection application 22 is an application dedicated to the fixed control device 20, and information indicating that the device is the fixed control device 20 may be described in the program. However, the embodiments are not limited to this, and a user may set one of the fixed control device 20 and the information processing device 100 for each device via the input device, in advance.

According to the result of the determination, the web API wrapper 123 generates an instance of the web API connection class 23 with a parameter of the host name of the connection destination of the fixed control device 20 (Step S34). Subsequently, the web API wrapper 123 transmits, to the generated instance of the web API connection class 23, a web API request with the parameter of the host name of the connection destination of the fixed control device 20 (Step S35). The web API connection class 23 transmits the web API request, which is transmitted from the web API wrapper 123, to the NCS 32 of the image forming apparatus 30 (Step S36). Upon receiving the web API request transmitted from the web API connection class 23 by the NCS 32, the image forming apparatus 30 executes a function corresponding to the web API request, and then the NCS 32 transmits a web API response to the function providing application 122 (Step S37).

As already described above, the function providing application 122 is an application that is common to the fixed control device 20 and the information processing device 100. Because the fixed control device 20 is directly and fixedly connected to the image forming apparatus 30, the host name of the connection destination is fixed to the host name of the image forming apparatus 30. Accordingly, in the example of FIG. 7, the web API request is transmitted to the image forming apparatus 30 with the parameter of the fixed host name (namely, the host name of the connection destination of the fixed control device 20).

Process Performed by Image Forming System 10 (Fourth Example)

Figure 8:
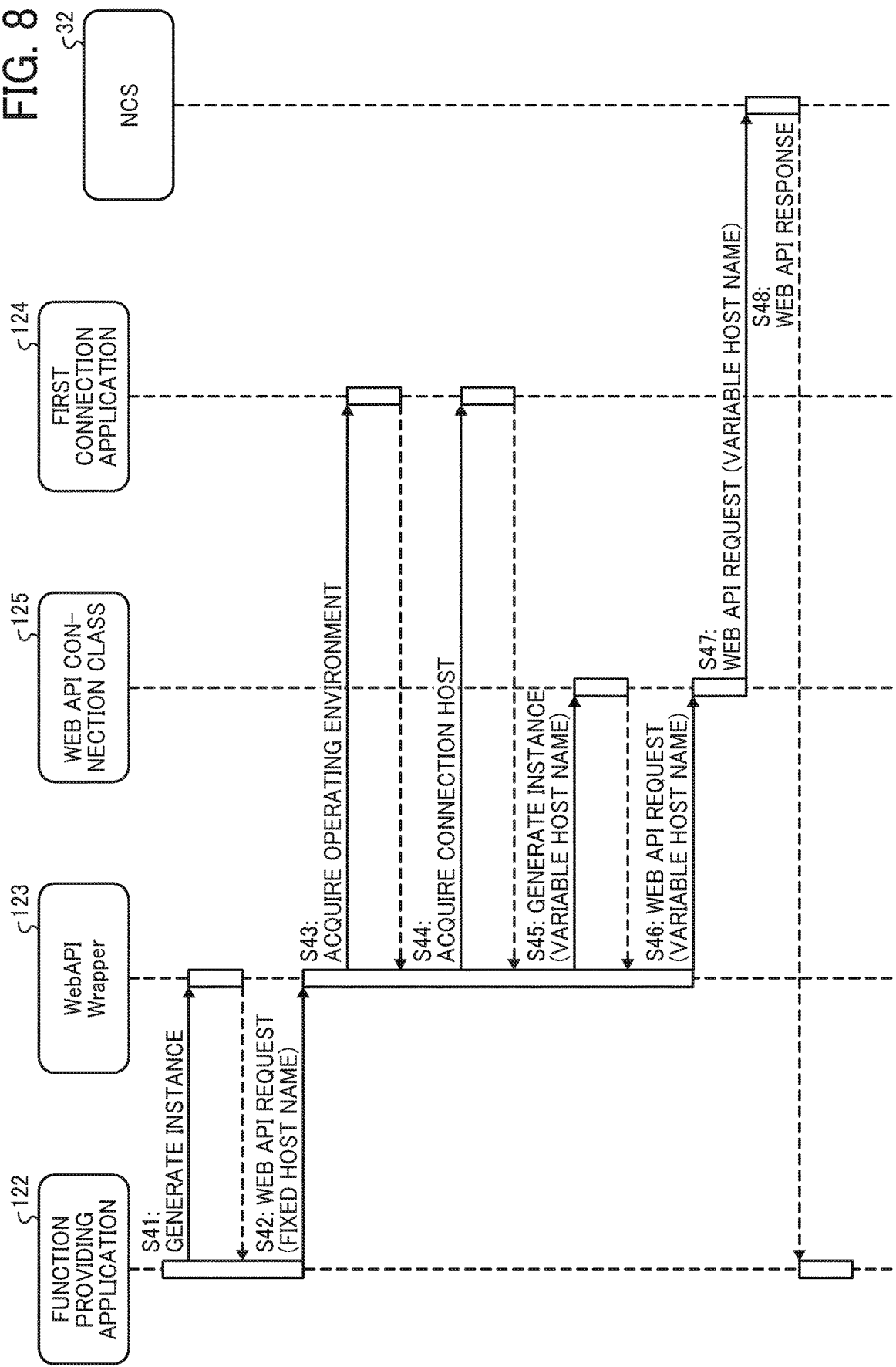
FIG. 8 is a sequence diagram illustrating a fourth example of a process performed by an image forming system according to an embodiment of the disclosure.

FIG. 8 is a sequence diagram illustrating a fourth example of the process performed by the image forming system 10 according to the present embodiment of the disclosure. In the following description of the fourth example, the image forming system 10 executes a function of the image forming apparatus 30 while identifying a host name of a connection destination, in response to a request from the function providing application 122 of the information processing device 100. Namely, in the fourth example described below, the function of the image forming apparatus 30 is executed by the function providing application 122 of the information processing device 100.

In the information processing device 100, the function providing application 122 generates an instance of the web API wrapper 123 to use the web API connection class 125 (Step S41). Subsequently, the function providing application 122 transmits, to the generated instance of the web API wrapper 123, a web API request with a parameter of a host name of a connection destination of the fixed control device 20 (Step S42).

Upon receiving the web API request transmitted from the function providing application 122, the web API wrapper 123 acquires information on the operating environment from the first connection application 124 (Step S43). Subsequently, the web API wrapper 123 determines whether the host name of the connection destination is fixed or variable (that is, whether the device on which the processing is being performed is the fixed control device 20 or the information processing device 100), based on the information on the operating environment. In the example of FIG. 7, the web API wrapper 123 determines that the host name of the connection destination is variable (that is, the device on which the processing is being performed is the information processing device 100). Here, the first connection application 124 retains information indicating whether the device is the fixed control device 20 or the information processing device 100, in advance. For example, the first connection application 124 is an application dedicated to the information processing device 100, and information indicating that the device is the information processing device 100 may be described in the program. However, the embodiments are not limited to this, and a user may set one of the fixed control device 20 and the information processing device 100 for each device via the input device, in advance.

According to the result of the determination, the web API wrapper 123 acquires, from the first connection application 124, the host name of the current connection destination, which is the image forming apparatus 30 currently connected (Step S44). Subsequently, the web API wrapper 123 generates an instance of the web API connection class 125 in a manner that a parameter includes the host name of the current connection destination acquired from the first connection application 124 (Step S45). Subsequently, the web API wrapper 123 transmits, to the generated instance of the web API connection class 125, a web API request with the parameter of the host name of the current connection destination acquired from the first connection application 124 (Step S46). The web API connection class 125 transmits the web API request received from the web API wrapper 123 to the NCS 32 of the image forming apparatus 30 (Step S47). Upon receiving the web API request transmitted from the web API connection class 125 by the NCS 32, the image forming apparatus 30 executes a function corresponding to the web API request, and then the NCS 32 transmits a web API response to the function providing application 122 (Step S48).

As already described above, the function providing application 122 is an application that is common to the fixed control device 20 and the information processing device 100. Because the information processing device 100 is not fixedly connected to the image forming apparatus 30, the host name of the connection destination is not fixed to the host name of the image forming apparatus 30, and the host name of the connection destination is variable. Accordingly, in the example of FIG. 8, the host name of the connection destination that is currently connected (namely, the variable host name) is acquired. The connection destination that is currently connected is also referred to as a current connection destination. In addition, in the example of FIG. 8, the web API request with the parameter of the host name of the current connection destination is transmitted to the image forming apparatus 30. The host name of the current connection destination is information that is stored in the information processing device 100 when the first connection application 124 is activated and the communication connection with the image forming apparatus 30 is established. When the first connection application 124 is activated, the first connection application 124 displays a screen for receiving an input of a host name or an IP address. When the user inputs device information such as a host name or an IP address on the screen, the image forming apparatus 30 corresponding to the device information is connected. In addition, authentication processing, which is described later, may be performed after the communication connection is established. When the authentication processing is performed, the first connection application 124 displays a screen for receiving an input of a user ID and a password, and then, when the user inputs authentication information such as a user ID and a password on the screen, the image forming apparatus 30 is logged in based on the authentication information.

Process Performed by Image Forming System 10
(Fifth Example)

Figure 9:
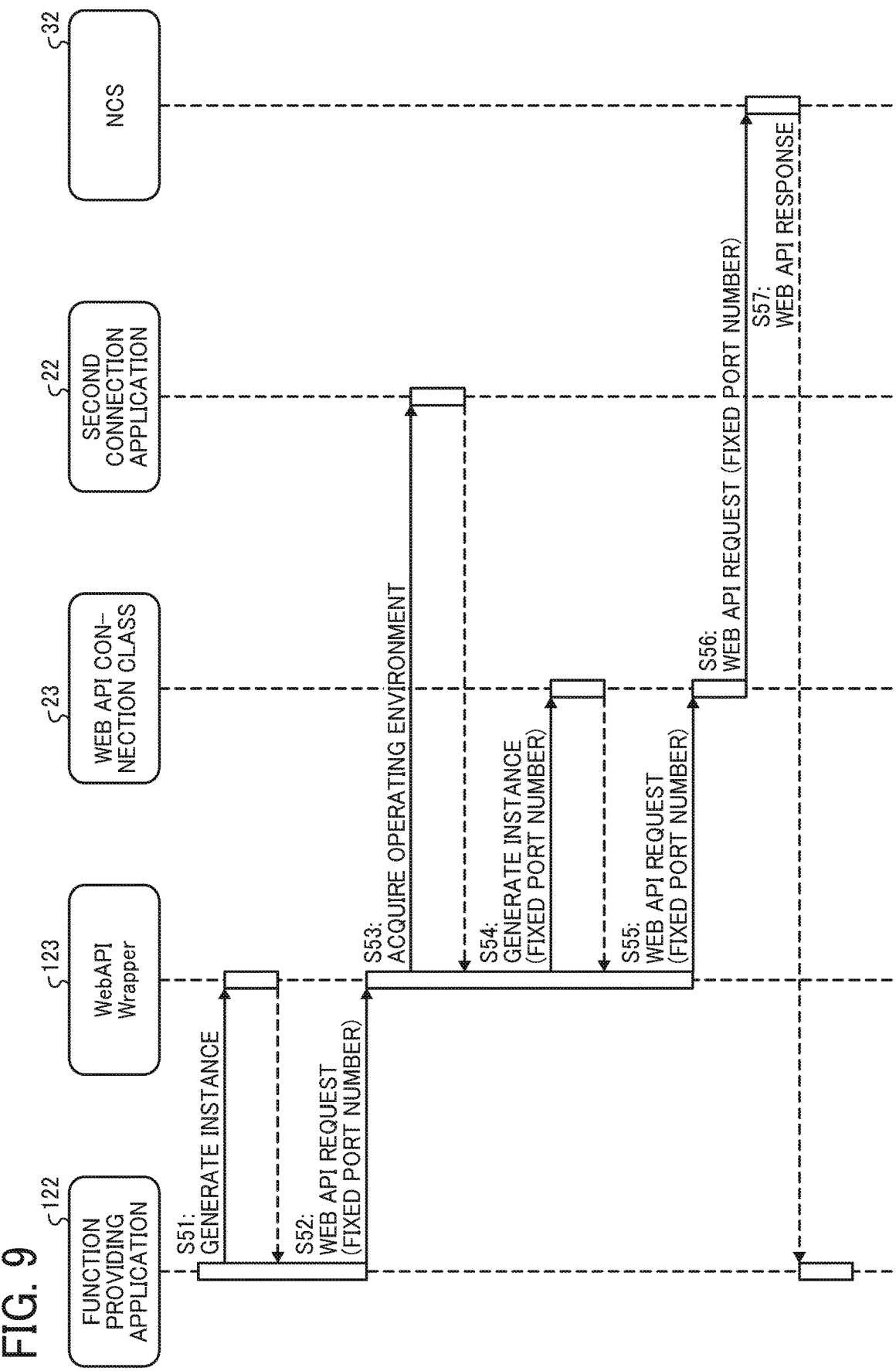
FIG. 9 is a sequence diagram illustrating a fifth example of a process performed by an image forming system according to an embodiment of the disclosure.

FIG. 9 is a sequence diagram illustrating a fifth example of the process performed by the image forming system 10 according to the present embodiment of the disclosure. In the following description of the fifth example, the image forming system 10 executes a function of the image forming apparatus 30 after changing a port number of a connection destination, in response to a request from the function providing application 122 of the fixed control device 20. Namely, in the fifth example described below, the function of the image forming apparatus 30 is executed by the function providing application 122 of the fixed control device 20.

In the fixed control device 20, the function providing application 122 generates an instance of the web API wrapper 123 to use the web API connection class 23 (Step S51). Subsequently, the function providing application 122 transmits, to the generated instance of the web API wrapper 123, a web API request with a parameter of a port number of a connection destination of the fixed control device 20 (Step S52). The function providing application 122 stores the port number of the connection destination of the fixed control device 20, in advance. For example, the port number of the connection destination of the fixed control device 20 may be described in the program of the function providing application 122. However, the embodiments are not limited to this, and a user may set a port number for each function providing application 122 via the input device, in advance.

Upon receiving the web API request transmitted from the function providing application 122, the web API wrapper 123 acquires information on the operating environment from the second connection application 22 (Step S53). Subsequently, the web API wrapper 123 determines whether the port number of the connection destination is fixed or variable (that is, whether the device on which the processing is being performed is the fixed control device 20 or the information processing device 100), based on the information on the operating environment. In the example of FIG. 9, the web API wrapper 123 determines that the port number of the connection destination is fixed (that is, the device on which the processing is being performed is the fixed control device 20).

According to the result of the determination, the web API wrapper 123 generates an instance of the web API connection class 23 with a parameter of the port number of the connection destination of the fixed control device 20 (Step S54). Subsequently, the web API wrapper 123 transmits, to the generated instance of the web API connection class 23, a web API request with the parameter of the port number of the connection destination of the fixed control device 20 (Step S55). The web API connection class 23 transmits the web API request received from the web API wrapper 123 to the NCS 32 of the image forming apparatus 30 (Step S56). Upon receiving the web API request transmitted from the web API connection class 23 by the NCS 32, the image forming apparatus 30 executes a function corresponding to the web API request, and then the NCS 32 transmits a web API response to the function providing application 122 (Step S57).

Because the fixed control device 20 is directly and fixedly connected to the image forming apparatus 30, the port number of the connection destination is fixed to a predetermined port number of the image forming apparatus 30. Accordingly, in the example of FIG. 9, the web API request is transmitted to the image forming apparatus 30 with the parameter of the fixed port number (namely, the port number of the connection destination of the fixed control device 20).

Process Performed by Image Forming System 10
(Sixth Example)

Figure 10:
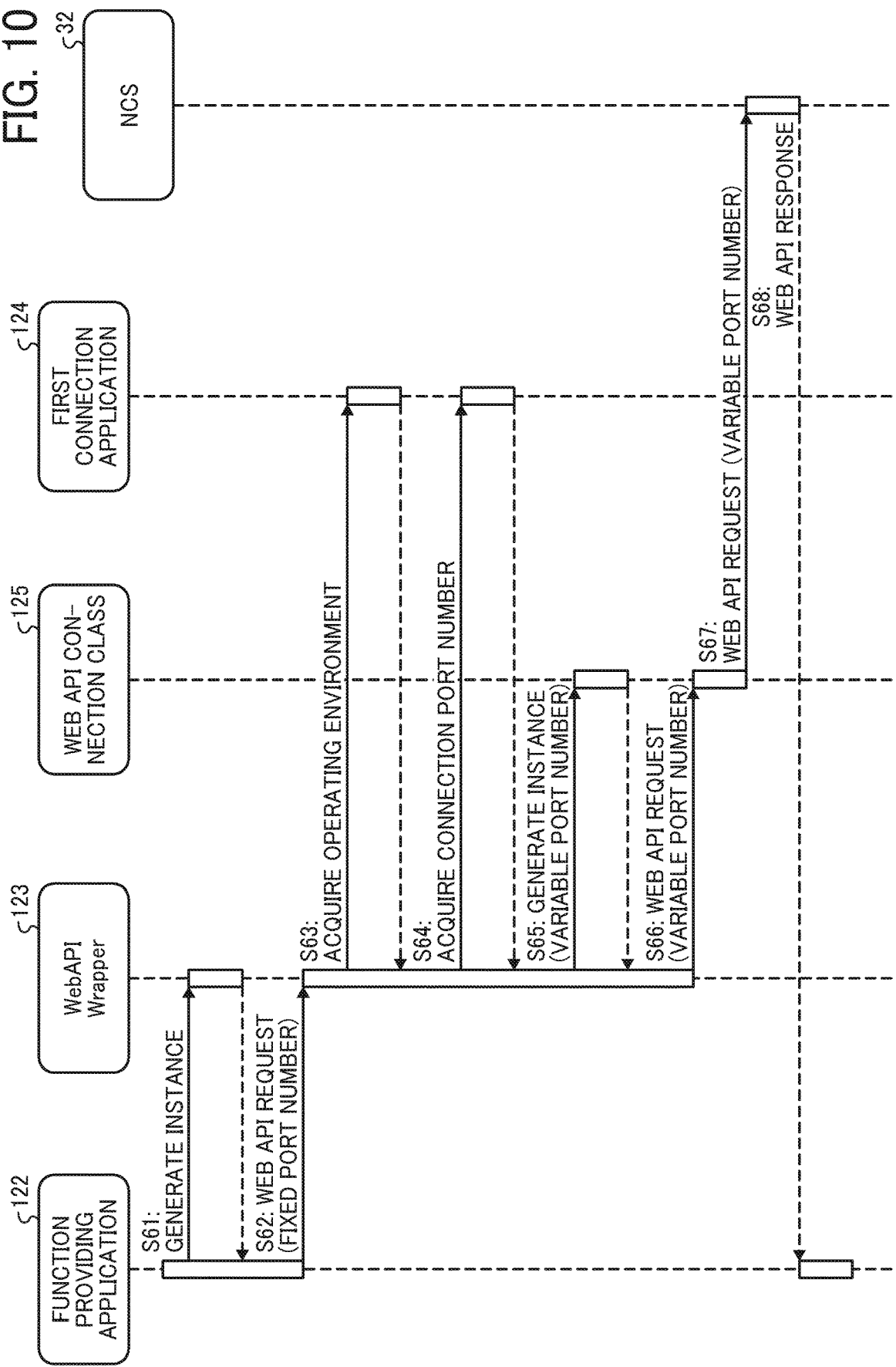
FIG. 10 is a sequence diagram illustrating a sixth example of a process performed by an image forming system according to an embodiment of the disclosure.

FIG. 10 is a sequence diagram illustrating a sixth example of the process performed by the image forming system 10 according to the present embodiment of the disclosure. In the following description of the sixth example, the image forming system 10 executes a function of the image forming apparatus 30 while changing a port number of a connection destination, in response to a request from the function providing application 122 of the information processing device 100. Namely, in the sixth example described below, the function of the image forming apparatus 30 is executed by the function providing application 122 of the information processing device 100.

In the information processing device 100, the function providing application 122 generates an instance of the web API wrapper 123 to use the web API connection class 125 (Step S61). Subsequently, the function providing application 122 transmits, to the generated instance of the web API wrapper 123, a web API request with a parameter of a port number of a connection destination of the information processing device 100 (Step S62).

Upon receiving the web API request transmitted from the function providing application 122, the web API wrapper 123 acquires information on the operating environment from the first connection application 124 (Step S63). Subsequently, the web API wrapper 123 determines whether the port number of the connection destination is fixed or variable (that is, whether the device on which the processing is being performed is the fixed control device 20 or the information processing device 100), based on the information on the operating environment. In the example of FIG. 10, the web API wrapper 123 determines that the port number of the connection destination is variable (that is, the device on which the processing is being performed is the information processing device 100).

According to the result of the determination, the web API wrapper 123 acquires, from the first connection application 124, the port number of the current connection destination, which is the image forming apparatus 30 (Step S64). Subsequently, the web API wrapper 123 generates an instance of the web API connection class 125 in a manner that a parameter includes the port number of the current connection destination acquired from the first connection application 124 (Step S65). In addition, the web API wrapper 123 transmits, to the generated instance of the web API connection class 125, a web API request with the parameter of the port number of the current connection destination acquired from the first connection application 124 (Step S66). The web API connection class 125 transmits the web API request received from the web API wrapper 123 to the NCS 32 of the image forming apparatus 30 (Step S67). Upon receiving the web API request transmitted from the web API connection class 125 by the NCS 32, the image forming apparatus 30 executes a function corresponding to the web API request, and then the NCS 32 transmits a web API response to the function providing application 122 (Step S68).

Because the information processing device 100 is not fixedly connected to the image forming apparatus 30, the port number of the connection destination is not fixed to a predetermined port number of the image forming apparatus 30, and the port number of the connection destination is variable. Accordingly, in the example of FIG. 10, the port number of the current connection destination (namely, the variable port number) is acquired, and the web API request with the parameter of the port number of the current connection destination is transmitted to the image forming apparatus 30. The port number of the current connection destination is information that is stored in the information processing device 100 when the first connection application 124 is activated and the communication connection with the image forming apparatus 30 is established.

Process Performed by Image Forming System 10
(Seventh Example)

Figure 11:
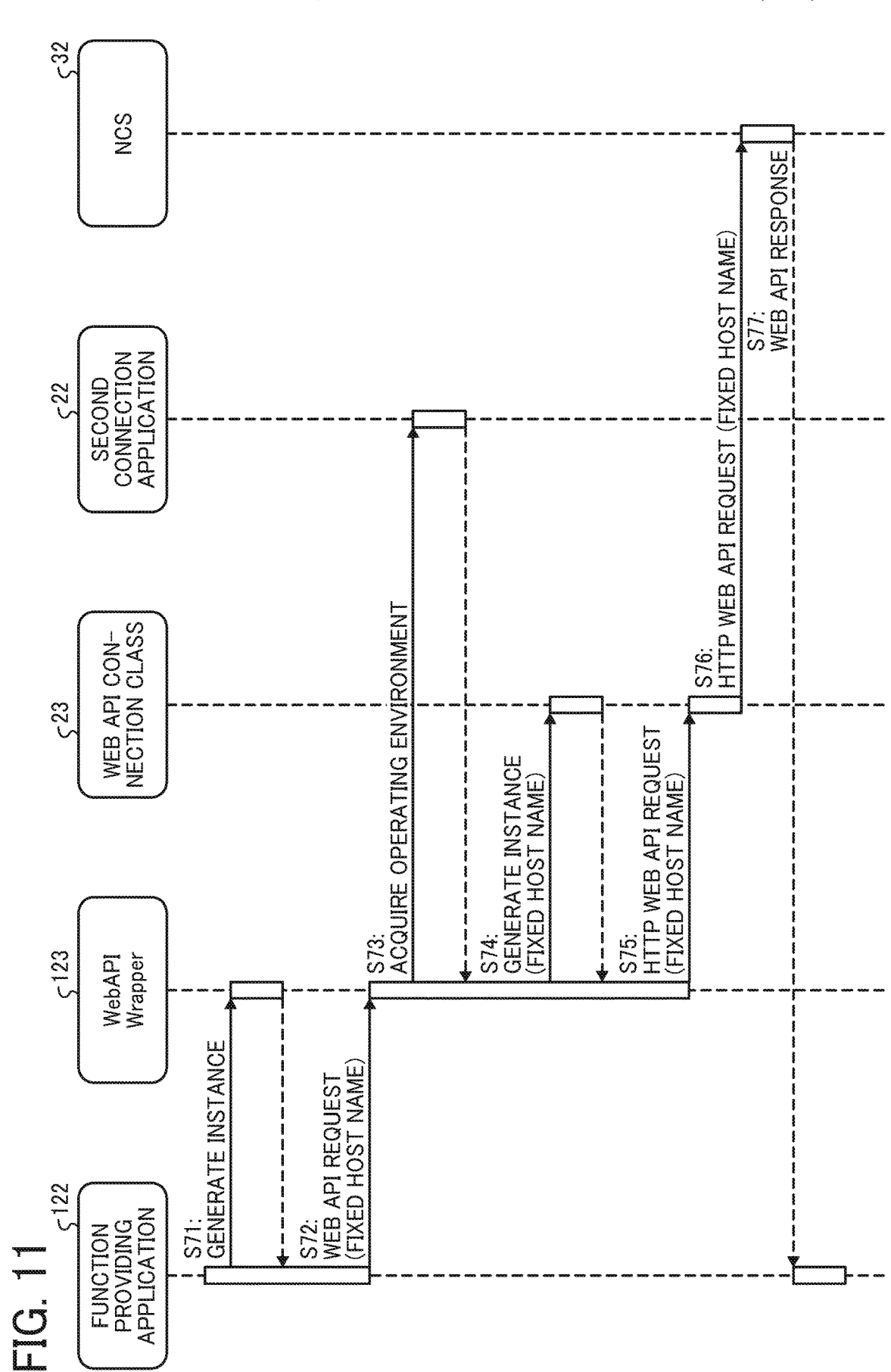
FIG. 11 is a sequence diagram illustrating a seventh example of a process performed by an image forming system according to an embodiment of the disclosure.

FIG. 11 is a sequence diagram illustrating a seventh example of the process performed by the image forming system 10 according to the present embodiment of the disclosure. In the following description of the seventh example, the image forming system 10 executes a function of the image forming apparatus 30 while automatically converting a Secure Sockets Layer (SSL) communication, in response to a request from the function providing application 122 of the fixed control device 20. Namely, in the fifth example described below, the function of the image forming apparatus 30 is executed by the function providing application 122 of the fixed control device 20.

In the fixed control device 20, the function providing application 122 generates an instance of the web API wrapper 123 to use the web API connection class 23 (Step S71). Subsequently, the function providing application 122 transmits, to the generated instance of the web API wrapper 123, a web API request with a parameter of a host name of a connection destination of the fixed control device 20 (Step S72).

Upon receiving the web API request transmitted from the function providing application 122, the web API wrapper 123 acquires information on the operating environment from the second connection application 22 (Step S73). Subsequently, the web API wrapper 123 determines whether the host name of the connection destination is fixed or variable (that is, whether the device on which the processing is being performed is the fixed control device 20 or the information processing device 100), based on the information on the operating environment. In the example of FIG. 11, the web API wrapper 123 determines that the host name of the connection destination is fixed (that is, the device on which the processing is being performed is the fixed control device 20).

According to the result of the determination, the web API wrapper 123 generates an instance of the web API connection class 23 with a parameter of the host name of the connection destination of the fixed control device 20 (Step S74). Subsequently, the web API wrapper 123 transmits, to the generated instance of the web API connection class 23, an HTTP web API request with the parameter of the host name of the connection destination of the fixed control device 20 (Step S75). The web API connection class 23 transmits the HTTP web API request received from the web API wrapper 123 to the NCS 32 of the image forming apparatus 30 (Step S76). Upon receiving the HTTP web API request transmitted from the web API connection class 23 by the NCS 32, the image forming apparatus 30 executes a function corresponding to the HTTP web API request, and then the NCS 32 transmits a web API response to the function providing application 122 (Step S77).

Process Performed by Image Forming System 10
(Eighth Example)

Figure 12:
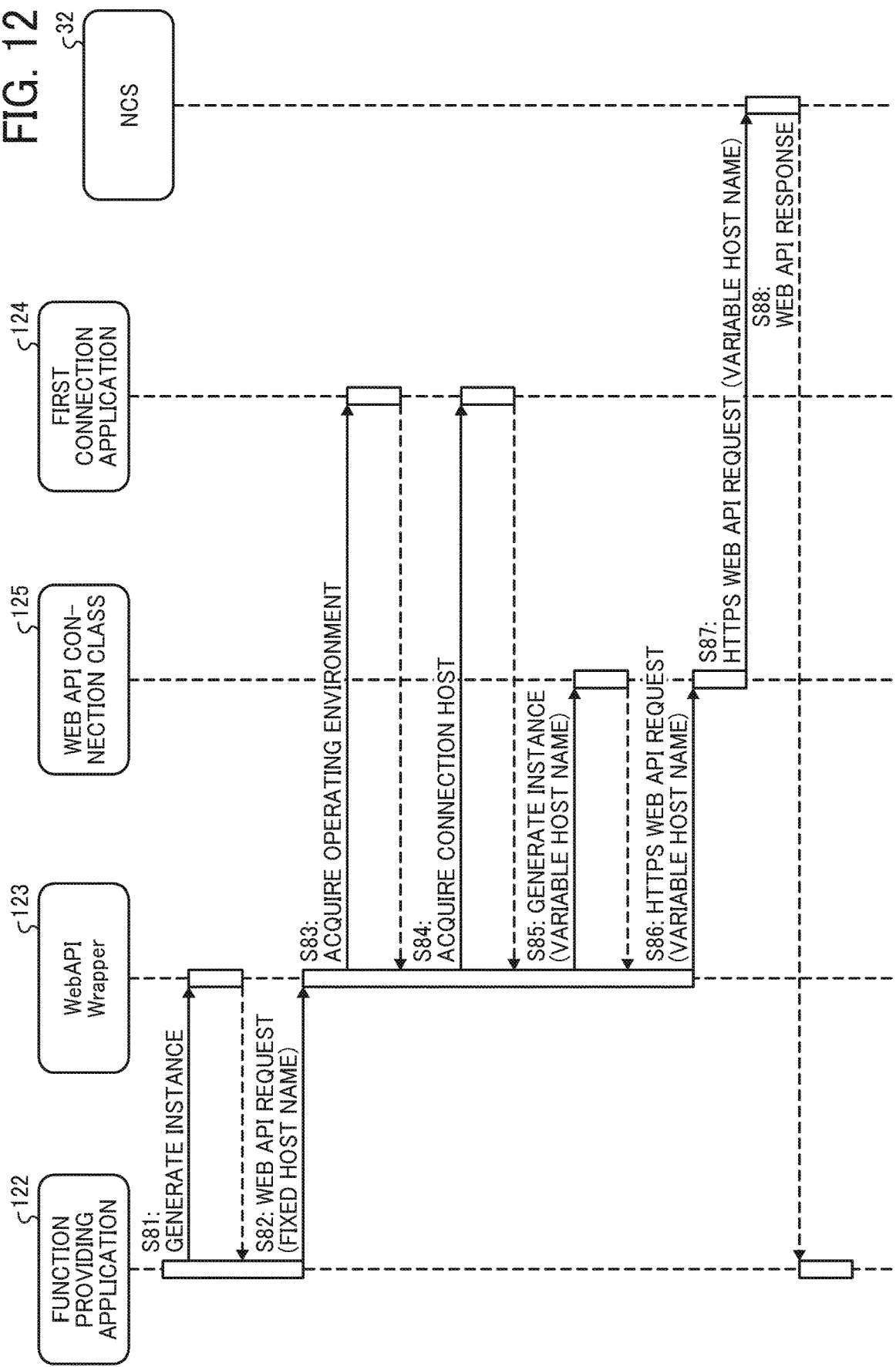
FIG. 12 is a sequence diagram illustrating an eighth example of a process performed by an image forming system according to an embodiment of the disclosure.

FIG. 12 is a sequence diagram illustrating an eighth example of the process performed by the image forming system 10 according to the present embodiment of the disclosure. In the following description of the eighth example, the image forming system 10 executes a function of the image forming apparatus 30 while automatically converting an SSL communication, in response to a request from the function providing application 122 of the information processing device 100. Namely, in the eighth example described below, the function of the image forming apparatus 30 is executed by the function providing application 122 of the information processing device 100.

In the information processing device 100, the function providing application 122 generates an instance of the web API wrapper 123 to use the web API connection class 125 (Step S81). Subsequently, the function providing application 122 transmits, to the generated instance of the web API wrapper 123, a web API request with a parameter of a host name of a connection destination of the fixed control device 20 (Step S82).

Upon receiving the web API request transmitted from the function providing application 122, the web API wrapper 123 acquires information on the operating environment from the first connection application 124 (Step S83). Subsequently, the web API wrapper 123 determines whether the host name of the connection destination is fixed or variable (that is, whether the device on which the processing is being performed is the fixed control device 20 or the information processing device 100), based on the information on the operating environment. In the example of FIG. 12, the web API wrapper 123 determines that the host name of the connection destination is variable (that is, the device on which the processing is being performed is the information processing device 100).

According to the result of the determination, the web API wrapper 123 acquires, from the first connection application 124, the host name of the current connection destination, which is the image forming apparatus 30 currently connected (Step S84). Subsequently, the web API wrapper 123 generates an instance of the web API connection class 125 in a manner that a parameter includes the host name of the current connection destination acquired from the first connection application 124 (Step S85). In addition, the web API wrapper 123 transmits, to the generated instance of the web API connection class 125, an HTTPS web API request with the parameter of the host name of the current connection destination acquired from the first connection application 124 (Step S86). The web API connection class 125 transmits the HTTPS web API request received from the web API wrapper 123 to the NCS 32 of the image forming apparatus 30 (Step S87). Upon receiving the HTTPS web API request transmitted from the web API connection class 125 by the NCS 32, the image forming apparatus 30 executes a function corresponding to the HTTPS web API request, and then the NCS 32 transmits a web API response to the function providing application 122 (Step S88).

The fixed control device 20 is a device that is directly and fixedly connected to the image forming apparatus 30 by, for example, a communication cable. With this configuration, there is a relatively small possibility of occurrence of security problems in the communication from the fixed control device 20 to the image forming apparatus 30. Accordingly, in the example illustrated in FIG. 11, the HTTP web API request is transmitted from the fixed control device 20 to the image forming apparatus 30. On the other hand, the information processing device 100 is a device that is connected to the image forming apparatus 30 via the network 12, which means the information processing device 100 is not fixedly connected to the image forming apparatus 30. With this configuration, there is a relatively high possibility of occurrence of security problems in the communication from the information processing device 100 to the image forming apparatus 30. Accordingly, in the example illustrated in FIG. 12, the HTTPS web API request is transmitted from the information processing device 100 to the image forming apparatus 30. That is, encryption is performed in the SSL communication, thereby improving the security of the communication.

Process Performed by Image Forming System 10
(Ninth Example)

Figure 13:
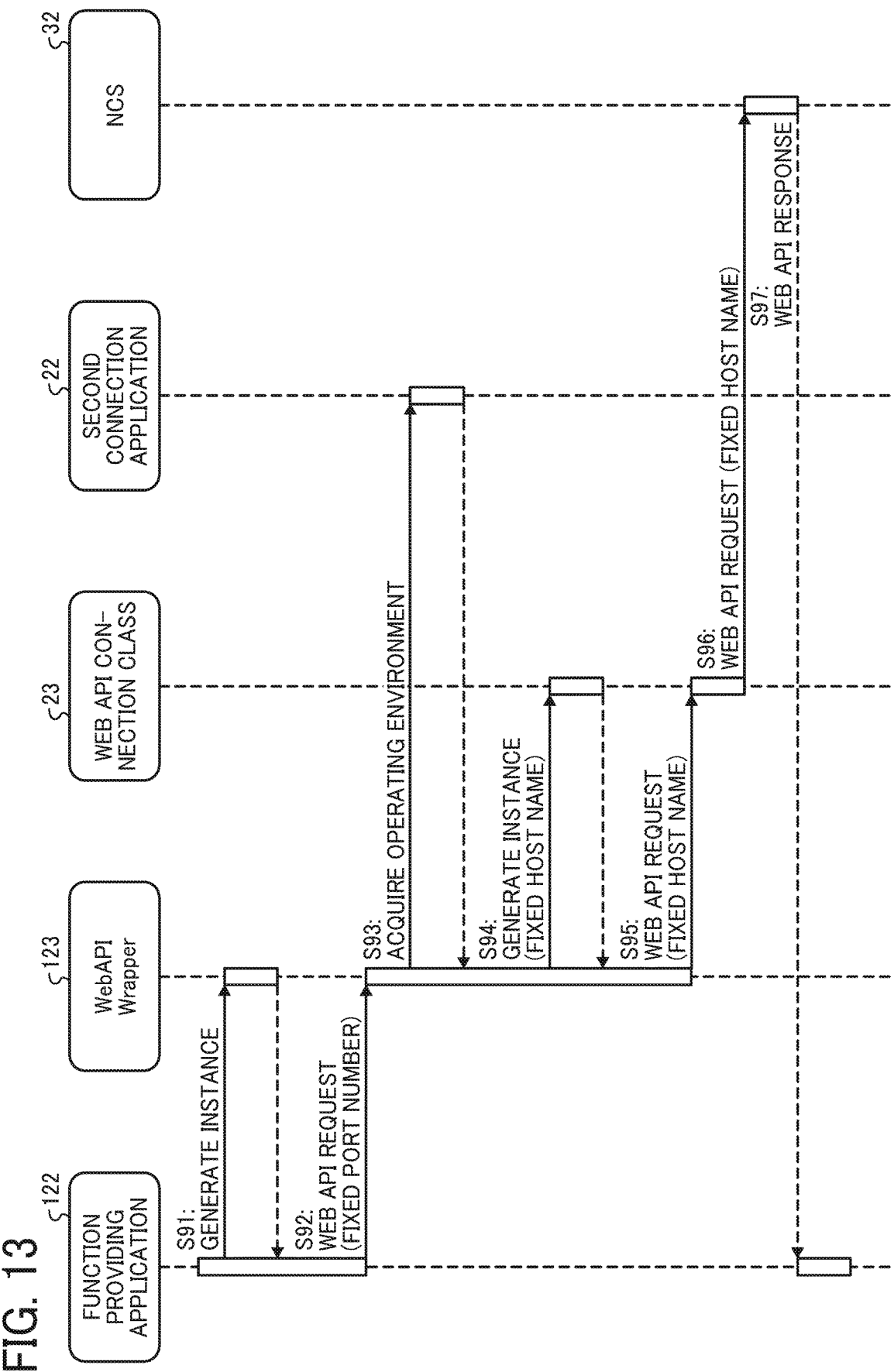
FIG. 13 is a sequence diagram illustrating a ninth example of a process performed by an image forming system according to an embodiment of the disclosure.

FIG. 13 is a sequence diagram illustrating a ninth example of the process performed by the image forming system 10 according to the present embodiment of the disclosure. In the following description of the ninth example, the image forming system 10 executes a function of the image forming apparatus 30 while automatically adding authentication information, in response to a request from the function providing application 122 of the fixed control device 20. Namely, in the ninth example described below, the function of the image forming apparatus 30 is executed by the function providing application 122 of the fixed control device 20.

In the fixed control device 20, the function providing application 122 generates an instance of the web API wrapper 123 to use the web API connection class 23 (Step S91). Subsequently, the function providing application 122 transmits, to the generated instance of the web API wrapper 123, a web API request with a parameter of a host name of a connection destination of the fixed control device 20 (Step S92).

Upon receiving the web API request transmitted from the function providing application 122, the web API wrapper 123 acquires information on the operating environment from the second connection application 22 (Step S93). Subsequently, the web API wrapper 123 determines whether the host name of the connection destination is fixed or variable (that is, whether the device on which the processing is being performed is the fixed control device 20 or the information processing device 100), based on the information on the operating environment. In the example of FIG. 13, the web API wrapper 123 determines that the host name of the connection destination is fixed (that is, the device on which the processing is being performed is the fixed control device 20).

According to the result of the determination, the web API wrapper 123 generates an instance of the web API connection class 23 with the parameter of the host name of the connection destination of the fixed control device 20 (Step S94). Subsequently, the web API wrapper 123 transmits, to the generated instance of the web API connection class 23, a web API request with the parameter of the host name of the connection destination of the fixed control device 20, but without a parameter of authentication information (Step S95). The web API connection class 23 transmits the web API request received from the web API wrapper 123 to the NCS 32 of the image forming apparatus 30 (Step S96). Upon receiving the web API request transmitted from the web API connection class 23 by the NCS 32, the image forming apparatus 30 executes a function corresponding to the web API request, and then the NCS 32 transmits a web API response to the function providing application 122 (Step S97).

Process Performed by Image Forming System 10
(Tenth Example)

Figure 14:
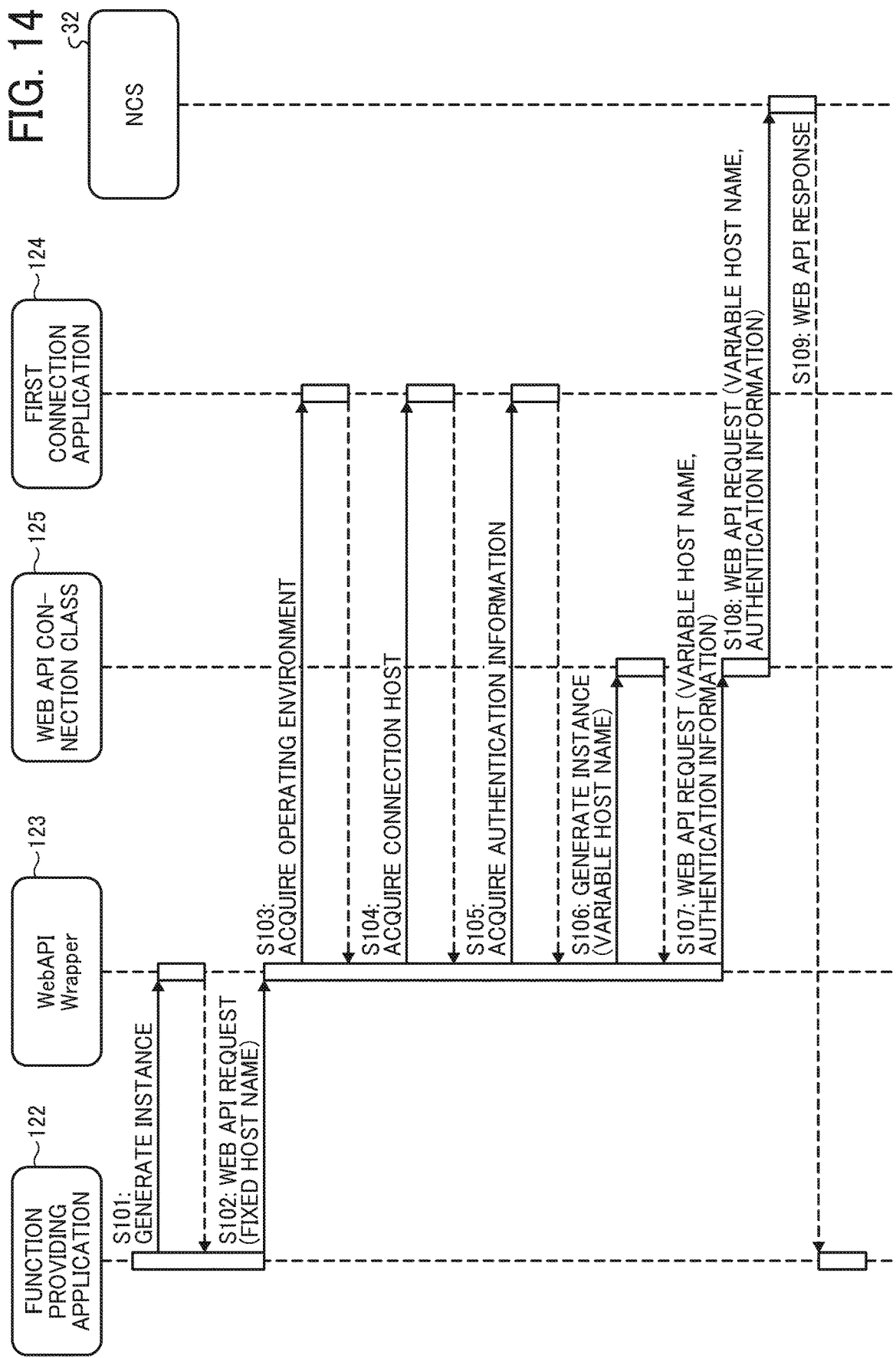
FIG. 14 is a sequence diagram illustrating a tenth example of a process performed by an image forming system according to an embodiment of the disclosure.

FIG. 14 is a sequence diagram illustrating a tenth example of the process performed by the image forming system 10 according to the present embodiment of the disclosure. In the following description of the tenth example, the image forming system 10 executes a function of the image forming apparatus 30 while automatically adding authentication information, in response to a request from the function providing application 122 of the information processing device 100. Namely, in the tenth example described below, the function of the image forming apparatus 30 is executed by the function providing application 122 of the information processing device 100.

In the information processing device 100, the function providing application 122 generates an instance of the web API wrapper 123 to use the web API connection class 125 (Step S101). Subsequently, the function providing application 122 transmits, to the generated instance of the web API wrapper 123, a web API request with a parameter of a host name of a connection destination of the fixed control device 20 (Step S102).

Upon receiving the web API request transmitted from the function providing application 122, the web API wrapper 123 acquires information on the operating environment from the first connection application 124 (Step S103). Subsequently, the web API wrapper 123 determines whether the host name of the connection destination is fixed or variable (that is, whether the device on which the processing is being performed is the fixed control device 20 or the information processing device 100), based on the information on the operating environment. In the example of FIG. 14, the web API wrapper 123 determines that the host name of the connection destination is variable (that is, the device on which the processing is being performed is the information processing device 100).

According to the result of the determination, the web API wrapper 123 acquires, from the first connection application 124, the host name of the current connection destination, which is the image forming apparatus 30 currently connected (Step S104). In addition, the web API wrapper 123 acquires authentication information that has been used for connecting to the image forming apparatus 30, which is currently connected, from the first connection application 124 (Step S105). For example, the authentication information includes a user ID and a password. The user ID and the password are information stored in the information processing device 100 at a time when the user authentication is performed after the first connection application 124 is activated and the communication connection with the image forming apparatus 30 is established. After the communication connection with the image forming apparatus 30 is established, the user inputs the user ID and the password. The information processing device 100 transmits the authentication information including the user ID and the password to the image forming apparatus 30, and the image forming apparatus 30 performs the user authentication based on the authentication information. When the user authentication performed by the image forming apparatus 30 is successful, the function of the image forming apparatus 30 is available to the information processing device 100.

Subsequently, the web API wrapper 123 generates an instance of the web API connection class 125 in a manner that a parameter includes the host name of the current connection destination acquired from the first connection application 124 (Step S106). In addition, the web API wrapper 123 transmits, to the generated instance of the web API connection class 125, a web API request with the parameter of the host name of the current connection destination and the authentication information acquired from the first connection application 124 (Step S107). The web API connection class 125 transmits the web API request received from the web API wrapper 123 to the NCS 32 of the image forming apparatus 30 (Step S108). Upon receiving the web API request transmitted from the web API connection class 125 by the NCS 32, the image forming apparatus 30 performs the user authentication based on the authentication information and executes the function corresponding to the web API request, and then the NCS 32 transmits a web API response to the function providing application 122 (Step S109).

The fixed control device 20 is a device that is directly and fixedly connected to the image forming apparatus 30 by, for example, a communication cable. With this configuration, there is a relatively small possibility of occurrence of unauthorized accesses in the communication from the fixed control device 20 to the image forming apparatus 30. Accordingly, in the example illustrated in FIG. 13, the web API request without the authentication information is transmitted from the fixed control device 20 to the image forming apparatus 30. On the other hand, the information processing device 100 is a device that is connected to the image forming apparatus 30 via the network 12, which means the information processing device 100 is not fixedly connected to the image forming apparatus 30. With this configuration, there is a relatively high possibility of occurrence of unauthorized accesses in the communication from the information processing device 100 to the image forming apparatus 30. Accordingly, in the example illustrated in FIG. 14, the web API request including the authentication information is transmitted from the information processing device 100 to the image forming apparatus 30. As described above, the image forming apparatus 30 performs the authentication using the authentication information, and this prevents access from an unauthorized user.

As described above, the information processing device 100 according to the present embodiment of the disclosure includes the function providing application 122 separately from the first connection application 124 that establishes a communication connection with the image forming apparatus 30. In addition, the information processing device 100, which includes the function providing application 122 separately from the first connection application 124, acquires information on the communication connection with the image forming apparatus 30, which is currently connected, using the first connection application 124 and transmits, using the acquired information on the communication connection, an execution request to execute a function of the image forming apparatus 30 to the image forming apparatus 30. Accordingly, in the information processing device 100 according to the present embodiment of the disclosure, the function providing application 122 can execute the function of the image forming apparatus 30 appropriately, even when the operating environment in relation to the image forming apparatus 30 is different from that of other terminal. In addition, the function providing application 122 can acquire, from the first connection application 124, the communication connection information required for requesting the image forming apparatus 30 to execute a function. Accordingly, the function providing application 122 can be commonly used by the information processing device 100 according to the present embodiment of the disclosure and other terminal device. Therefore, according to the information processing device 100 according to the present embodiment of the disclosure, it is possible to enhance the versatility of a cooperative application operating in cooperate with the image forming apparatus 30, resulting in simplification in producing the cooperative application.

In particular, the information processing device 100 according to the present embodiment of the disclosure that includes the function providing application 122 that is the same function providing application 122 included in the fixed control device 20, does not have to generate a function providing application dedicated to the information processing device 100. The function providing application 122 covers a difference (for example, whether the communication connection information is fixed or variable) between the information processing device 100 and the fixed control device 20, and can use a function of the image forming apparatus 30 in the same manner as the fixed control device 20.

According to the present embodiment described above, a function of the communication target device can be appropriately executed according to the operating environment of the terminal device on which the application is installed on.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An information processing device, comprising
a memory configured to store a first application and a second application executable on the information processing device; and
a processor configured to,
determine, based on environment information, whether an operating environment of the information processing device is a first operating environment or a second operating environment such that the processor determines that the information processing device is operating in the first operating environment in response to the environment information indicating that the information processing device communicates with a communication target device via a wireless communication and determines that the information processing device is operating in the second operating environment in response to the environment information indicating that the information processing device communicates with the communication target device via a wired communication,
acquire, via the second application executed by the processor of the information processing device, communication connection information on a communication connection with the communication target device, in response to the processor determining that the information processing device operates in the first operating environment,
establish, via the second application executed by the processor of the information processing device, the communication connection with the communication target device using the communication connection information, and
execute the first application to acquire, from the second application, the communication connection information associated with the communication connection established with the communication target device by the second application, and to transmit, over the communication connection established by the second application, a function execution request to the communication target device, the function execution request requesting execution of a function on the communication target device.

2. The information processing device of claim 1, wherein the first application configures the processor to,
set, based on the communication connection information, the function execution request to be transmitted to the communication target device.

3. The information processing device of claim 2, wherein the first application configures the processor to,
acquire authentication information related to the communication connection with the communication target device, and transmit, to the communication target device, the function execution request based on the communication connection information and the authentication information.

4. The information processing device of claim 3, wherein, the function execution request transmitted to the communication target device in the first operating environment is a Hypertext Transfer Protocol Secure (HTTPS) request, and
the function execution request transmitted to the communication target device in the second operating environment is a Hypertext Transfer Protocol (HTTP) request.

5. The information processing device of claim 1, wherein, the processor is configured to transmit the function execution request to the communication target device using predetermined communication connection information, in response to the processor determining that the information processing device operates in the second operating environment.

6. The information processing device of claim 1, wherein
the first operating environment is an environment in which the information processing device is connected to the communication target device using the communication connection information that is variable, and
the second operating environment is an environment in which the information processing device is connected to the communication target device using the communication connection information that is static.

7. The information processing device of claim 1, wherein the communication connection information includes a host name of a connection destination.

8. The information processing device of claim 1, wherein the communication connection information includes a port number of a connection destination.

9. An image forming system, comprising:
the information processing device according to claim 1; and
the communication target device configured to execute a function, based on a function execution request received from the information processing device.

10. The image forming system of claim 9, wherein the communication target device is an image forming device that executes an image forming function.

11. The information processing device of claim 1, wherein each of the first application and the second application are executable by a same processor on a same one of the information processing device such that the second application controls the communication connection established between the information processing device and the communication target device to assist the first application in transmitting the function execution request to the communication target device.

12. The information processing device of claim 1, wherein the first application includes a web application programming interface (API) wrapper configured to wrap a web API connection class.

13. The information processing device of claim 12, wherein the web API wrapper is configured to wrap the web API connection class such that the first application is communicably connected to the communication target device regardless of whether the operating environment of the information processing device is the first operating environment or the second operating environment.

14. The information processing device of claim 13, wherein the processor is configured to execute the first application to,
generate an instance of the web API connection class of the first application, acquire, from the second application, the communication connection information of the commination target device including a host name of the communication target device,
transmit, via the instance of the web API connection class, the function execution request to the communication target device using the host name obtained from the second application,
receive, by the instance of the web API connection class, a response from the communication target device in response to the function execution request.

15. An information processing method performed by an information processing device, the method comprising:
storing, in a memory of the information processing apparatus, a first application and a second application executable in the information processing apparatus;
determining, based on environment information, whether an operating environment of the information processing device is a first operating environment or a second environment such that the processor determines that the information processing device is operating in the first operating environment in response to the environment information indicating that the information processing device communicates with a communication target device via a wireless communication and determines that the information processing device is operating in the second operating environment in response to the environment information indicating that the information processing device communicates with the communication target device via a wired communication;
acquiring, via the second application executed by the processor of the information processing device, communication connection information on a communication connection with the communication target device, in response to the determining that the information processing device operates in the first operating environment;
establishing, via the second application executed by the processor of the information processing device, the communication connection with the communication target device using the communication connection information; and
executing the first application to acquire, from the second application, the communication connection information associated with the communication connection established with the communication target device by the second application, and to transmit, over the communication connection established by the second application, a function execution request from the first application to the communication target device, the function execution request requesting execution of a function on the communication target device.

16. The information processing method of claim 15, wherein each of the first application and the second application are executable by a same processor on a same one of the information processing device such that the second application controls the communication connection established between the information processing device and the communication target device to assist the first application in transmitting the function execution request to the communication target device.

17. A non-transitory recording medium storing a plurality of instructions which, when executed by one or more processors, cause the processors to perform an information processing method, comprising:

storing, in a memory of the information processing apparatus, a first application and a second application executable in the information processing apparatus determining, based on environment information, whether an operating environment of the information processing device is a first operating environment or a second environment such that the processor determines that the information processing device is operating in the first operating environment in response to the environment information indicating that the information processing device communicates with a communication target device via a wireless communication and determines that the information processing device is operating in the second operating environment in response to the environment information indicating that the information processing device communicates with the communication target device via a wired communication;

acquire, via the second application executed by the processor of the information processing device, communication connection information on a communication connection with the communication target device, in response to the determining that the information processing device operates in the first operating environment;

establishing, via the second application executed by the processor of the information processing device, the communication connection with the communication target device using the communication connection information; and executing the first application to acquire, from the second application, the communication connection information associated with the communication connection established with the communication target device by the second application, and to transmit, over the communication connection established by the second application, a function execution request to the communication target device, the function execution request requesting execution of a function on the communication target device.

18. The non-transitory recording medium of claim 17, wherein each of the first application and the second application are executable by a same processor on a same one of the information processing device such that the second application controls the communication connection established between the information processing device and the communication target device to assist the first application in transmitting the function execution request to the communication target device.

* * * * *